United States Patent [19]
Balachandran et al.

[11] Patent Number: 5,832,384
[45] Date of Patent: Nov. 3, 1998

[54] METHOD AND APPARATUS FOR FREQUENCY AGILITY IN A COMMUNICATION SYSTEM

[76] Inventors: Kumar Balachandran, 8507 Capricorn way, #78, San Diego, Calif. 92126; Jason Wang, 3977 Tynebourne Cir., San Diego, Calif. 92130-1220; Yvonne Kammer, 3036 Driscoll Dr., San Diego, Calif. 92117-4318

[21] Appl. No.: 408,644

[22] Filed: Mar. 22, 1995

Related U.S. Application Data

[63] Continuation-in-part of Ser. No. 152,005, Nov. 12, 1993.
[51] Int. Cl.$^6$ ........................................... H04Q 7/22
[52] U.S. Cl. ................................................. 455/450
[58] Field of Search ........................ 370/95.1; 379/58, 379/59, 61, 62; 455/33.1, 33.4, 34.1, 54.2, 450

[56] References Cited

U.S. PATENT DOCUMENTS

| | | | |
|---|---|---|---|
| 5,361,401 | 11/1994 | Pirillo | 455/53.1 |
| 5,377,222 | 12/1994 | Sanderford, Jr. | 375/1 |
| 5,396,539 | 3/1995 | Slekys et al. | 379/59 |
| 5,448,619 | 9/1995 | Evans et al. | 379/58 |

FOREIGN PATENT DOCUMENTS 0 521 610 A2  1/1993  European Pat. Off. .
WO 95/13685  5/1995  WIPO .

*Primary Examiner*—William Cumming
*Attorney, Agent, or Firm*—Heller Ehrman White & McAuliffe

[57] ABSTRACT

A method and apparatus used in the context of a first and a second communications network, wherein the second communications network is overlaid upon the first communications network. The invention generates and utilizes a number of flags and indicators to determine which channel, from among a plurality of shared channels assignable to a first communications network (e.g., an AMPS network) and a second communications network (e.g., a CDPD network), will be used next for communicating information by the second network (e.g., a CDPD information). The invention provides a means for generating an ordered Idle_Channel list. The Idle_Channel list includes each assignable channel that is not currently used by the first or second communications network. In one embodiment of the present invention, the order of the channels in the Idle_Channel list at any given time determines the order of the channels to be selected for transmission of a signal by the second communications network. In alternative embodiments of the present invention, the idle channels are ordered based upon the likelihood that they will be assigned for use by the first communications network when an additional channel is required by the first communications network.

12 Claims, 13 Drawing Sheets

| | 1011 | 1012 | 1014 | 1024 |
|---|---|---|---|---|
| CHANNEL 1 | 1 | 1 | 0 | 0 |
| CHANNEL 2 | 0 | 1 | 0 | 0 |
| CHANNEL 3 | 1 | 1 | 0 | 0 |
| CHANNEL 5 | 1 | 0 | 1 | 0 |
| CHANNEL 7 | 0 | 0 | 0 | 1 |
| CHANNEL 8 | 1 | 0 | 0 | 1 |
| CHANNEL 9 | 0 | 0 | 0 | 1 |
| CHANNEL 15 | 1 | 0 | 0 | 1 |
| CHANNEL 16 | 0 | 0 | 0 | 1 |
| CHANNEL 17 | 1 | 1 | 1 | 0 |
| CHANNEL 21 | 1 | 1 | 0 | 0 |
| CHANNEL 25 | 1 | 1 | 0 | 1 |
| CHANNEL 28 | 1 | 1 | 1 | 1 |
| ⋮ | | | | |
| CHANNEL n | 0 | 1 | 1 | 1 |
| CHANNEL n+1 | 0 | 1 | 1 | 1 |

*FIG. 10B*

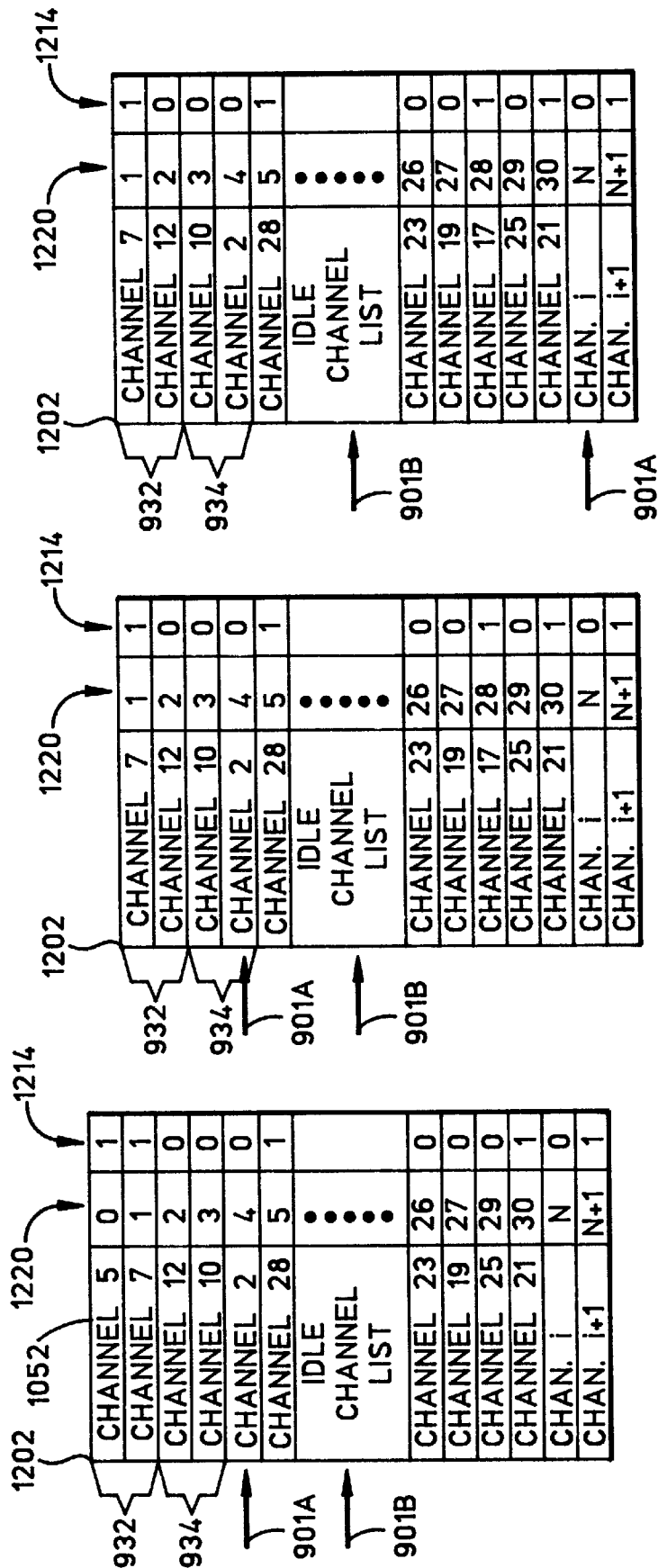

METHOD AND APPARATUS FOR FREQUENCY AGILITY IN A COMMUNICATION SYSTEM

CROSS-REFERENCE TO RELATED APPLICATION

This application is a continuation-in-part of the U.S. Pat. application entitled "Cellular Digital Packet Data Mobile Data Base Station" having Ser. No. 08/152,005 that was filed on Nov. 12, 1993 and assigned to PCSI, Inc and is incorporated herein by reference.

BACKGROUND OF THE INVENTION

1. Field of the Invention

This invention relates to a frequency agile mobile communications, and more particularly, to a method and apparatus for determining to which channel within a frequency agile communications network overlaid upon another communications network a device should change, and the conditions under which that change is to be initiated.

2. Description of Related Art

Bandwidth is currently a precious commodity in communications networks. Therefore, it is increasingly important to utilize bandwidth in an efficient manner. With this in mind, attempts to define new services which require additional bandwidth have focused on multiplexing the bandwidth that is already allocated. Thus, bandwidth is used in a more efficient manner than would be the case if additional bandwidth were to be allocated for the new service. For example, a mobile cellular communications system, commonly referred to as Advanced Mobile Phone Service (AMPS), was established to allow voice communications between base stations located within a "cell" and a cellular telephone ("cellular phone"). Groups of base stations in a single serving area in concert with a mobile telephone switching office (MTSO) control access to and from a cellular telephone user. The resources allocated to AMPS are also now being used by users that need to communicate data rather that voice.

In recent times, efforts have been made to transceive non-voice digital packet data from/to users within a mobile communications network. To accomplish this, a system known as Cellular Digital Packet Data (CDPD) was designed. The CDPD data communications network is a cellular data network overlaid on AMPS. That is, CDPD base stations, referred to as Mobile Data Base Station MDBS), may be co-situated with AMPS base stations and share the use of the same set of channel frequencies in each cell. The cells for the two networks preferably have the same geographical footprints. In accordance with the specification for CDPD (CDPD Release 1.0, Jul. 19, 1993), data is packetized and transmitted on AMPS channels that are allocated to AMPS but not occupied by an AMPS signal (i.e., no cellular telephone call is assigned at that time to the particular channel). When an AMPS signal is detected, the CDPD signal has a predefined period within which to vacate the channel (i.e., hop to another channel, if available), and thus, not interfere with AMPS transmissions. Through the use of frequency agility, the system is non-intrusive to the AMPS network and requires no additional allocation of bandwidth.

FIG. 1 is a simplified block diagram which illustrates one relationship between the AMPS network and CDPD network. The co-situated CDPD and AMPS base station 100 communicates through antenna 101 respectively with Mobile End Systems (MES), such as MESes 121A and 121B via antennae 102A and 102B, and with AMPS mobile units, such as cellular phones 106A and 106B via antennae 104A and 104B. Typically within the combined CDPD and AMPS base station 100, an AMPS transmitter 105 is coupled to a front end gain amplifier 103 which amplifies the outgoing radio-frequency (RF) signal before transmitting the RF signal through the antenna 101. As the RF signal is output by the AMPS transmitter 105, the RF signal is coupled to a coupling pad 107 which provides a portion of the RF signal to a CDPD "sniffer" circuit 109. The CDPD sniffer circuit 109 detects the AMPS RF signal on various channels and causes the CDPD transmitter 212 (as shown in FIG. 2) to cease transmitting CDPD signals on those channels that are going to be used by the AMPS network.

Once the CDPD network detects that the AMPS network is attempting to use a channel, the CDPD network must clear that channel. Therefore, transmissions on the CDPD network may become inefficient if attempts to use a channel are frequently interrupted by the AMPS network's attempts to use the same channels. Furthermore, some AMPS networks use a method known as "foreign carrier detection" to detect power which is present on any of the channels that are allocated for use by the AMPS network. In such systems, if power which originates from a source other than the AMPS network is detected for a predetermined amount of time, the channel is determined to have interference and is "sealed". Once a channel is sealed, the channel will not be used until a predetermined amount of time passes. Therefore, it is critical that the CDPD network vacate a channel before the AMPS network detects the CDPD signal as "interference". For this reason, the CDPD specification defines a parameter, "Max_Channel_Time", that indicates the maximum amount of time a channel can be used for transmitting a CDPD signal. Similarly, some AMPS networks also detect power on a channel for a predetermined period after the system ceases transmitting information on the channel. Power that is detected during this period will cause the channel to be sealed and make that channel unavailable to the AMPS network.

Still further, when the AMPS network attempts to transmit a signal on a channel that is being used by CDPD, the CDPD signal must vacate within 40 ms. Thus, there is insufficient time to provide information to the mobile end system to indicate on which channel the base station is going to attempt to continue the transmission (i.e., to which channel the base station will hop). Therefore, the MES must search through each of the available channels to determine which channel the base station has selected. Such searches require time and thus increase the time required to communicate information between an MES and a base station of the CDPD network.

Accordingly, it is desirable to provide a system that predicts which channels are least likely to be used by a first communications network in order to determine which channels are most desirable for use by a second communications network overlaid on the first communications network. In addition, it is desirable to maintain a list of channels that have recently been used by the first communications network and prevent the second communications network from using each of these channels for a predetermined period of time. Still further, it is desirable to provide a second communications network which may be overlaid upon the first communications network such that the first communications network does not perceive transmissions from the second communications network as interference.

SUMMARY OF THE INVENTION

The present invention is a method and apparatus used in the context of a first and a second communications network, wherein the second communications network is overlaid upon the first communications network. In accordance with the present invention, channel usage is maximized while minimizing the impact of each communications network upon the other.

The present invention generates and utilizes a number of flags and indicators to determine which channel, from among a plurality of shared channels assignable to a first communications network (e.g., an AMPS network) and a second communications network (e.g., a CDPD network), will be used next for communicating information by the second network (e.g., a CDPD information). The present invention provides a means for generating an ordered Idle_Channel list. The Idle_Channel list includes each assignable channel that is not currently used by the first or second communications network. A channel on the Idle_Channel list is "idle" if not currently being used by the either the first or second communications network. In accordance with first embodiment of the present invention, the Idle_Channel list is ordered such that each channel is in random order from "head" to "tail" of the list. In accordance with the first embodiment of the present invention, the Idle_Channel list is randomized each time a channel hop occurs. In one embodiment of the present invention, the order of the channels in the Idle_Channel list at any given time determines the order of the channels to be selected for transmission of a signal by the second communications network. In alternative embodiments of the present invention, the idle channels are ordered based upon the likelihood that they will be assigned for use by the first communications network when an additional channel is required by the first communications network.

In accordance with embodiments of the present invention, a predetermined number of channels must remain idle and available for use by the first communication system, thus establishing a "Backoff Zone". In order to accomplish this, a number of channels are made unavailable to the second communications network. Therefore, whenever the number of available channels is fewer than the Backoff Zone, channels used by the second communication system are released in accordance with a procedure which allows an end system and a base station of the second communications network to coordinate the channel change, and thus reestablish the Backoff zone. Since a channel is immediately available to the first communications network, the second communications network can take longer to vacate one of the other channels. Thus, both the impact of the first communication system upon the second communication system, and the impact of the second communication system upon the first communication system, are minimized.

The present invention further provides a means for generating a Likely_Hop list. In the preferred embodiment, a predetermined number of channels at the head of the Idle_Channel list make up the Likely_Hop list. Therefore, the Likely_Hop list is a subset of channels which are on the Idle_Channel list. The Likely_Hop list is used to determine the channel to which the base station of the second communications network will change when a channel hop is performed.

In addition, in accordance with embodiments of the present invention, a Channel_Layoff list is generated. The Channel_Layoff list is preferably implemented as a subset of the Idle_Channel list. In the preferred embodiment, channels included in the Chan_Layoff list have two flags associated with each channel. Either one or both may indicate that the channel is in layoff from a communication system. The first of these flags, AMPS_Layoff flag, indicates that the associated channel had been used within a predetermined period of time (as determined by a AMPS_Layoff timer) by the first communications network. The second of the flags, CDPD_Layoff flag, indicates that the associated channel had been used within a second predetermined period of time (as determined by a CDPD_Layoff timer) by the second communications network. In accordance with the preferred embodiment of the present invention, a parameter referred to as AMPS_Layoff_Time defines the amount of time which must elapse after the first communications network relinquishes a channel and before the AMPS_Layoff flag may be reset. Similarly, a parameter referred to as Max_Layoff Time defines the amount of time which must elapse after the second communications network relinquishes a channel and before the CDPD_Layoff flag may be reset.

A Layoff_Usage indicator, such as a flag, is preferably set to indicate whether channels on the Channel_Layoff list may be used by the second communications network. Resetting the Layoff_Usage flag precludes any of the channels on the Channel_Layoff list from being used by the second communications network. If the Layoff_Usage flag is set, the usage of channels which are on the Chan_Layoff list (i.e., for which the associated CDPD_Layoff flag or AMPS_Layoff flag are set) is determined by the state of the CDPD_Layoff flag or AMPS_Layoff flag. That is, in accordance with one embodiment, channels may not be used to transmit signals on the second communications network if the AMPS_Layoff flag and the Layoff_Usage flag are both set. However, channels for which the CDPD_Layoff flag is set and the AMPS_Layoff flag is not set may be used when the Layoff_Usage flag is set, but are assigned a lower priority than each available channel not on the Chan_Layoff list.

In accordance with embodiments of the present invention, a Hop_Threshold parameter may be defined which determines a "Threshold Zone". The second communications network performs a planned channel hop to a channel having a lower assignment priority if a present channel used by the second communications network falls within the Threshold Zone. If there are no idle channels available having a lower priority for the first communications network, then no channel hop is performed by the second communications network and the processor waits until an idle channel becomes available.

In one embodiment of the present invention, channels are assigned for use by the first communications network in accordance with a first-in-first-out (FIFO) assignment scheme. That is, channels released most recently by the first communications network are placed at the head of an Idle_Channel list, and a predetermined number of channels which were released least recently are precluded from use by the second communications network to establish a Backoff zone. Therefore, the assignment priority of each channel in the Idle_Channel list is based upon the amount of time that has elapsed since that channel has been used, relative to the amount of time that has elapsed since each of the other channels in the Idle_Channel list had been used.

Furthermore, in accordance with one embodiment of the present invention used in conjunction with a first communications network having a FIFO assignment scheme, channels may be grouped in sets. Each channel within one set is assigned a higher priority than each channel within another set. For example, channels within a first set are assigned a higher priority than channels within a second set.

The set of channels that have a higher priority may change at specified intervals. Accordingly channels within the first set are always used by the second communications network before channels included in the second set. In accordance with one embodiment of the present invention, the determination as to which channels are assigned to a particular set is made based upon the assignment priority of that channel with respect to the first communications network. That is, channels which are more likely to be assigned to carry information for the first communications network are assigned to the set having lower assignment priority for the purposes of the second communications network, and channels having a lower assignment priority with respect to the first communications network are assigned to the set having higher priority for use by the second communications network.

In one embodiment, the present invention may be used with a first communications network in which channels are assigned for use by the first communications network sequentially. That is, each channel is ordered within the first communications network and associated with an assignment number (i.e., ranking). Channels are assigned for use by the first communications network sequentially from highest to lowest assignment number. In accordance with the present invention as used with such a network, a predetermined number of channels remain idle, thus establishing a Backoff Zone. Accordingly, the second communications network may not use a channel when there are less than a predetermined number of other idle channels having assignment numbers lower than the assignment number of the particular channel. In addition, a Hop_Threshold parameter may be defined in a manner similar to that described above.

The details of the preferred embodiment of the present invention are set forth in the accompanying drawings and the description below. Once the details of the invention are known, numerous additional innovations and changes will become obvious to one skilled in the art.

BRIEF DESCRIPTION OF THE DRAWINGS

FIG. 10B illustrates the storage of each channel and its associated flags or indicators maintained by the processor of the present invention.

FIGS. 12A–C illustrate the organization of the Idle_Channel list in accordance with one embodiment of the present invention where a first communications network selects channels using a sequential algorithm.

Note that like reference numbers and designations in the various drawings refer to like elements.

DETAILED DESCRIPTION OF THE INVENTION

Throughout this description, the preferred embodiment and examples shown should be considered as exemplars, rather than as limitations on the present invention.

The present invention provides a method and apparatus which is used in conjunction with a first communications network (such as Advanced Mobile Phone Service (AMPS)) on which a second communications network (such as Cellular Digital Packet Data (CDPD)) has been overlaid to determine which channels from among a number of available channels should be selected for transmitting information by the second communications network without impacting the first communications network while achieving efficiency within the second communications network.

First Embodiment of the Present Invention

In accordance with a first embodiment of the present invention, a channel selection strategy is provided which optimizes the amount of time the second communications network is transmitting end user information, and minimizes idle time and overhead of the second communications network, regardless of the selection method used by the first communications network to select channels for transmission on the first communications network.

Figure 10A:
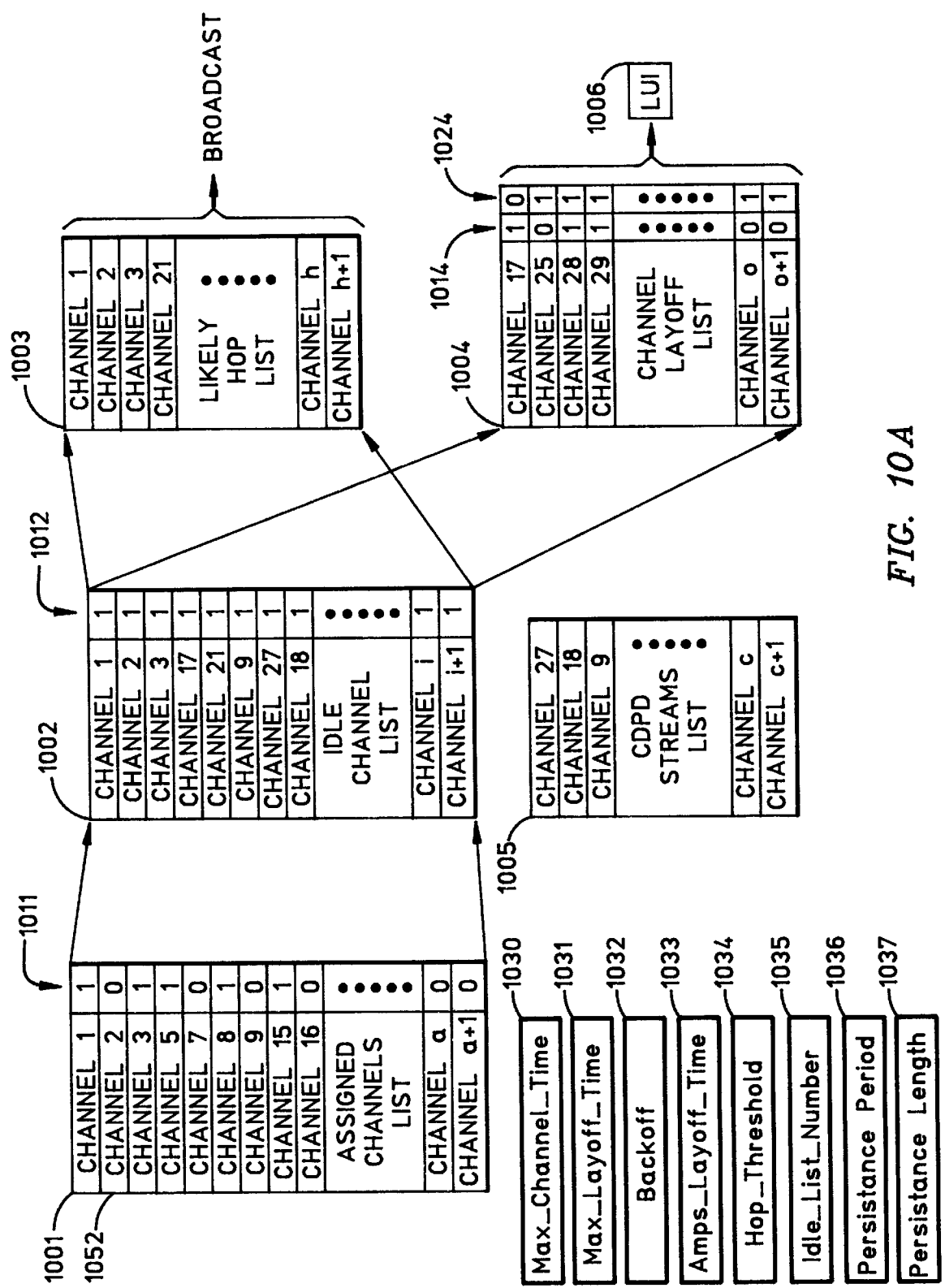
FIG. 10A illustrates the parameters and lists utilized in accordance with the first embodiment of the present invention.

In accordance with the first embodiment of the present invention, five lists are generated and maintained. FIG. 10A illustrates the five lists. In an alternative embodiment, flags or other indicators may be utilized to indicate the individual status of a channel as illustrated in FIG. 10B. For example, a single list of all available channels may be maintained, and each of the other lists generated by marking those channels that are included in each list with a flag or indicator.

Referring to FIG. 10A, the first list ("Assigned-Channels" list 1001) includes each of the channels that are assigned for use by either the first or the second communications network. The "Assigned_Channels" list 1001 illustrated in FIG. 10A includes channels designated by channel numbers, such as CHANNEL "1", CHANNEL "2", . . . , CHANNEL "a", and CHANNEL "a+1". CHANNEL "1 " is at "head" of the list. CHANNEL "a+1", where "a" is a variable, is at the "tail" of the list. In accordance with one embodiment of the present invention, channel numbers on the Assigned_Channels list are preferably in a range from 0 to 999. Channel numbers may be skipped to provide separation between channels for a given base station and area. Sets of channels within the Assigned_Channels list 1001 may be assigned a priority relative to other sets of channels. In accordance with one embodiment of the present invention, channels having higher priority for use in the second communications network are referred to as "non-extended" channels. Channels that are accorded lower priority for use in the second communications network are referred to as "extended" channels. For example, in some AMPS infrastructure equipment (base station/switch equipment) a number of channels which use extended frequencies are typically assigned a higher priority than channels which use non-extended frequencies (i.e., channels that use extended frequencies are selected for use before channels which use non-extended frequencies). Accordingly, in one embodiment of the present invention, a "Priority_Set" flag 1011 is preferably set to determine whether each channel is an extended or non-extended channel. In alternative embodiments in which more than two sets of channels are provided, each with a different priority, more than one Priority_Set flag may be required.

The second list ("Idle_Channel" list 1002) is a subset of the Assigned_Channels list 1001. In accordance with one embodiment of the present invention, channels currently not occupied by the first communications network to communicate information are included in the Idle_Channel list 1002. Channels currently not used by either the first or the second communications networks are referred to as idle channels. Idle channels are preferably indicated by an "Idle" flag 1012. In the preferred embodiment of the present invention, only channels on the Idle_Channel list 1002 may be selected for use by the second communications network. In FIG. 10A, CHANNEL "1" is at the head of the Idle_Channel list 1002. CHANNEL "i+1" (where "i" is a variable) is at the tail of the Idle_Channel list 1002. In an alternative embodiment of the present invention, the Idle_Channel list 1002 includes channels in use by the second communications network.

The third list ("Likely_Hop" list 1003) is a subset of the Idle_Channel list 1002. The Likely_Hop list 1003 includes those channels which are the most likely candidates for use by the second communications network when a frequency hop is to be performed. CHANNEL "1" is at the head of the Likely_Hop list 1003. CHANNEL "h+1" (where "h" is a variable) is at the tail of the Likely_Hop list 1003. In accordance with one embodiment of the present invention, the Likely_Hop List 1003 includes the first three channels of the Idle_Channel list 1002. In alternative embodiments, the number of channels in the Likely_Hop list 1003 may differ. For example, in one alternative embodiment, the Likely_Hop list 1003 comprises the first two channels of the Idle_Channel list 1002. In accordance with the present invention, the Likely_Hop list 1003 is broadcast to each end system of the second communication system on a regular time interval. In the preferred embodiment, the Likely_Hop list 1003 is broadcast to each end system at intervals which are equal in duration to one-half the maximum amount of time the second communications network may occupy a channel. Preferably, the Likely_Hop list 1003 is broadcast each time a counter assigned to monitor the maximum channel usage time indicates that half the maximum time has expired. For example, in a CDPD network, a base station would maintain the Likely_Hop list 1003 and broadcast the list to each mobile end system in the cell associated with that base station when the channel has been occupied for half the maximum time allowed for CDPD transmission. Thus, each end system has advance information as to which channel the base station is likely to hop.

The fourth list ("Chan_Layoff" list 1004) is also a subset of the Idle_Channel list 1002. The Chan_Layoff list 1004 includes channels that were recently occupied by either the first or the second communications network. In Chan_Layoff list 1004 CHANNEL "17" is at the head of the list. CHANNEL "o+l" (where "o" is a variable) is at the tail of the list. In accordance with one embodiment of the present invention, an "AMPS_Layoff" flag 1014 is associated with each channel and indicates whether that channel was recently occupied by the first communications network. Likewise, a "CDPD_Layoff" flag 1024 is associated with each channel and indicates whether that channel was recently occupied by the second communications network. In one embodiment of the present invention, a "Layoff_Usage" indicator (LUI) 1006, such as an LUI flag, is in a first state, such as reset, to indicate that channels included in the Chan_Layoff list 1004 may not be occupied by the second communications network. Alternatively, placing the LUI in a second state, such as by setting the LUI flag, the LUI 1006 indicates that a channel on the Chan_Layoff list 1004 may be occupied, but is to be assigned a lower priority than other idle channels which are not on the Chan_Layoff list 1004.

Figure 1:
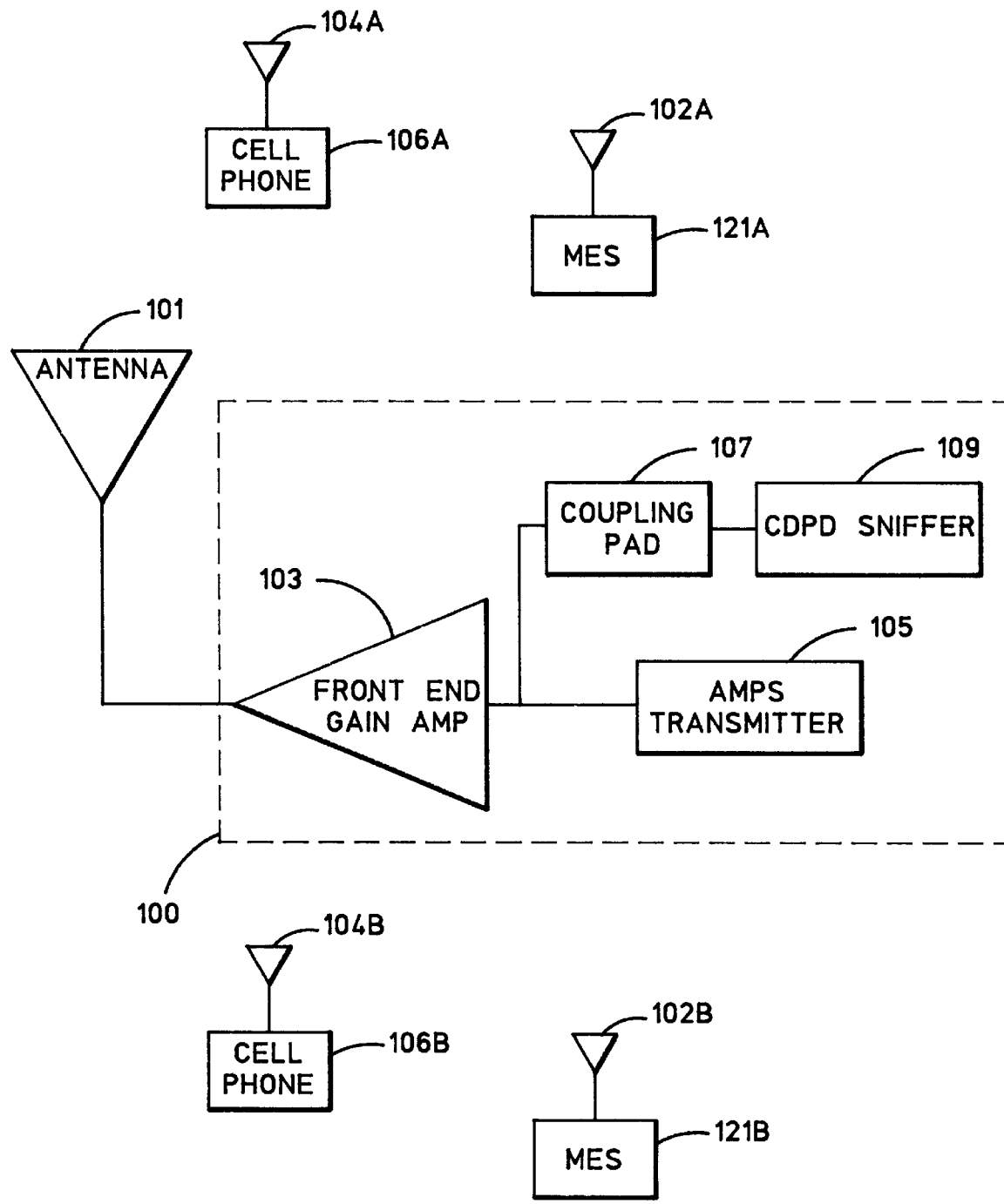
FIG. 1 is a simplified block diagram which illustrates the relationship of the AMPS network to the CDPD network within a base station.
Figure 2:
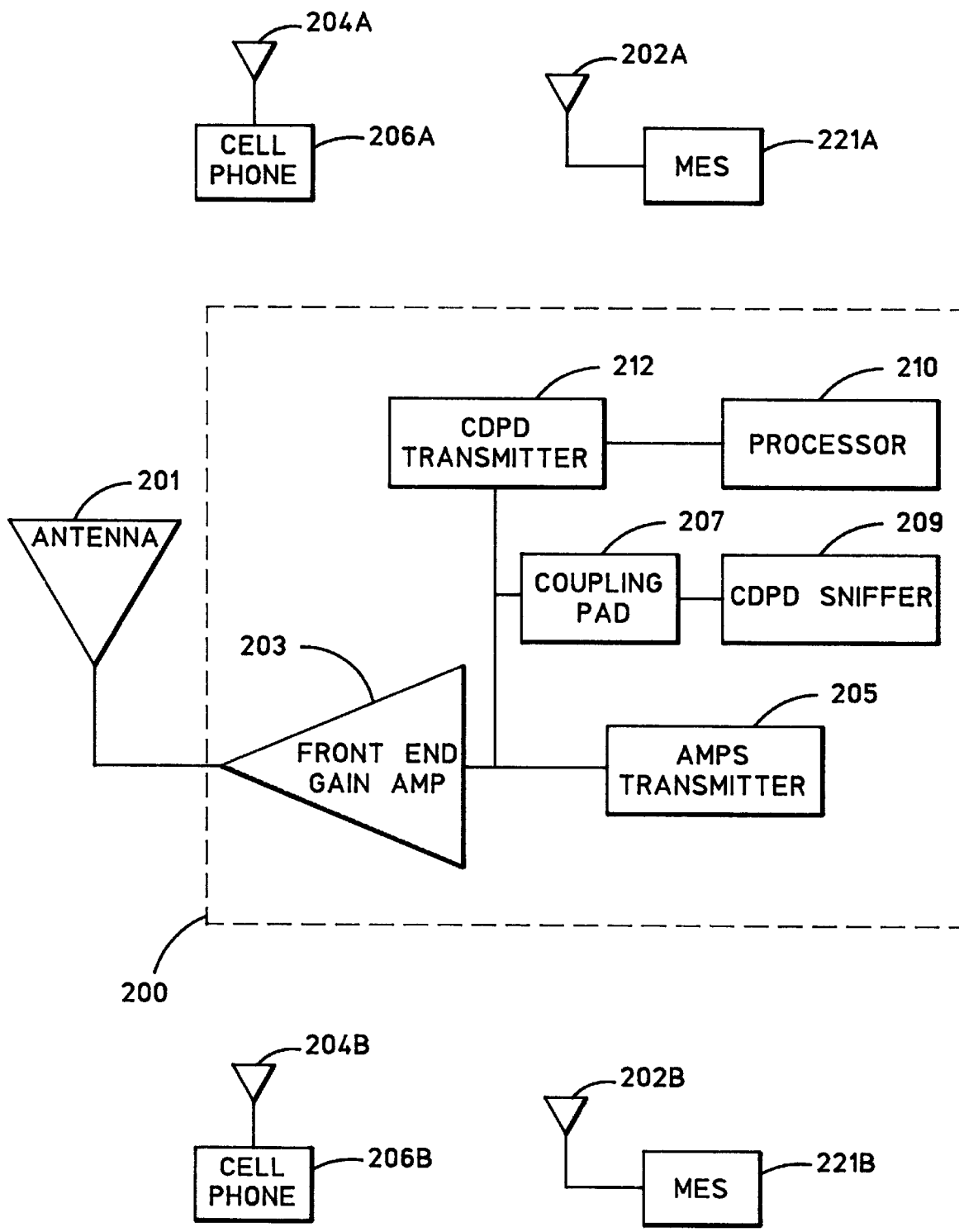
FIG. 2 is a block diagram of the present invention.

The fifth list ("CDPD_Streams" list 1005) includes each channel that is occupied by the second communications network. In one embodiment of the present invention, the processor 210 in FIG. 2 compares the Idle_Channel list 1002 with the CDPD_Streams list 1005 to determine which idle channels on the Idle_Channel list are not currently used by the second communications network. In "CDPD_Streams" list 1005 of FIG. 10A, CHANNEL "27" is at the head of the list. CHANNEL "c+1" (where "c" is a variable) is at the tail of the list.

In accordance with one embodiment of the present invention, four parameters are provided. The first parameter ("Max_Channel_Time" 1030) establishes the maximum amount of time the second communications network can occupy any channel without releasing the channel. For example, a CDPD network may maintain a channel for no more than 20 seconds without releasing that channel. Accordingly, the Max_Channel_Time 1030 is preferably set to a default value of 20 seconds when the second communications network is a CDPD network. The second parameter ("Max_Layoff_Time" 1031) indicates the amount of time that should elapse between the release of a channel by the second communications network and the reassignment of the channel for use by the second communications network. The third parameter ("Backoff" 1032) indicates the number of channels that should remain idle at all times to reduce the chance that the second communications network will have to vacate a channel on short notice. In the preferred embodiment of the present invention, if the Backoff parameter 1032 is violated, channels are released by the second communications network until the Backoff parameter 1032 is no longer violated. In accordance with one embodiment of the present invention, the Backoff parameter 1032 is set at two. The fourth parameter ("AMPS_Layoff_Time" 1033) is the amount of time which should preferably elapse between the release of a channel by the first communications network and the use of that channel by the second communications network. Complying with the AMPS_Layoff_Time 1033 ensures that a first communications network that monitors channels for interference after release of a channel will not mistake a signal transmitted on a channel by the second communications network for interference.

Figure 10C:
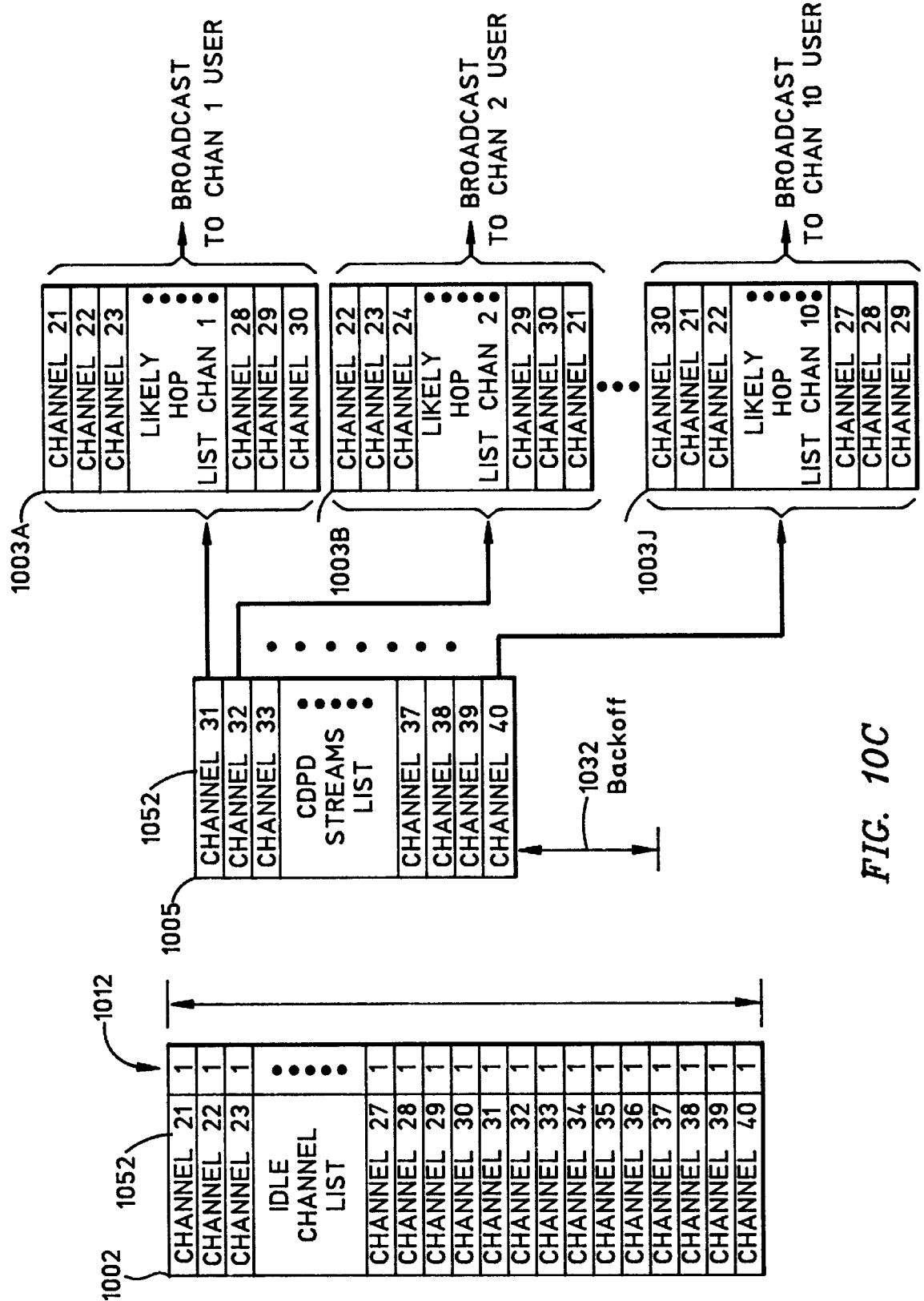
FIG. 10C illustrates a second embodiment of the present invention that associates a different likely hop list with each occupied channel of the second communication system.
Figure 11:
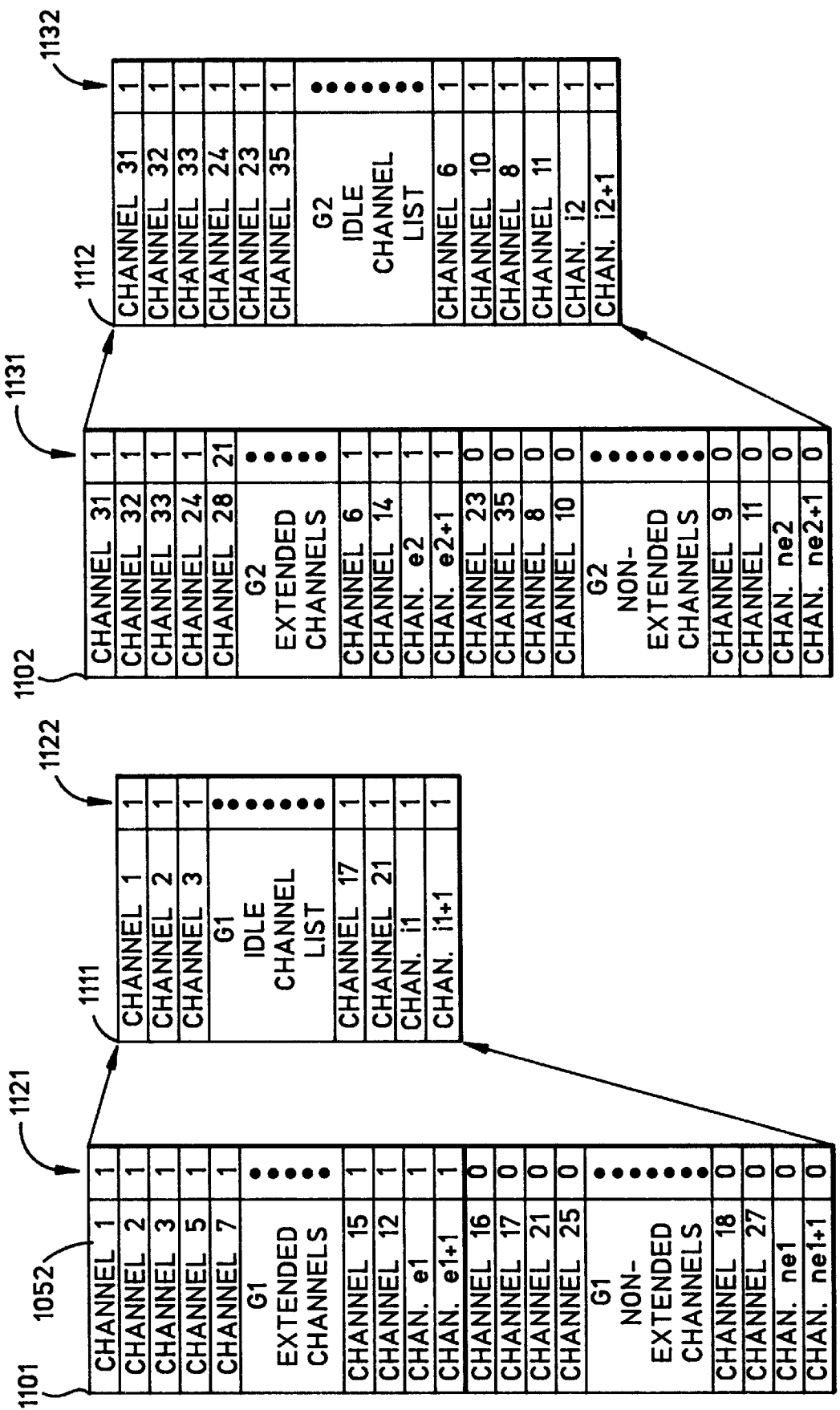
FIG. 11 illustrates the first and second group of lists in the generation of group one and group two idle channel lists of one embodiment of the present invention.

Referring to FIG. 10B, channel numbers 1052 associated with each channel available for use by the first or second communications network are preferably maintained by a processor (such as the processor 210 in FIG. 2) within a storage device 1051, such as local memory, registers within the processor 210, hard disk, optical disk drive, flash RAM, etc. Each channel number 1052 is preferably associated with flags or other indicators, such as Priority_Set flag 1011, Idle flag 1012, AMPS_Layoff flag 1014, and CDPD_Layoff flag 1024. In an alternative embodiment, additional indicators include a ranking number 1220 (see FIGS. 12A–C) that indicates a relationship between the associated channel and other channels. In one embodiment, the ranking number 1220 indicates a grouping (such as illustrated in FIG. 11), order, or membership in various Likely_Hop lists 1003 (see FIG. 10C). Other indicators associated with each channel may also be generated by the processor 210. These flags and indicators associate the channels with the various lists or groupings, such as those depicted in FIG. 10A.

FIG. 2 is a block diagram of the present invention. The base station 200 transmits signals associated with the first communications network through antenna 201 to end units 206A and 206B (such as cellular phones) which receive the signals via antennae 204A, 204B. The base station 200 also transmits signals associated with the second communications network to end systems 221 (such as MES). The end systems 221A and 221B receive the signals via antennae 202A, 202B. Antenna 201 is coupled to a front end gain amplifier 203. The front end gain amplifier 203 receives signals from an AMPS transmitter 205 which supplies the output signal associated with the first communications network. A coupling pad 207 is also coupled to the output of the AMPS transmitter 205 and receives a portion of the signal output from the AMPS transmitter 205. The output from the coupling pad 207 is coupled to a CDPD sniffer circuit 209 which detects the presence of radio frequency energy at each of the frequencies assigned to either the first or the second communications network. The CDPD sniffer circuit 209 reports the presence of such energy to a processor 210. The processor 210 is coupled to a CDPD transmitter 212. The processor 210 may be any device capable of controlling the CDPD transmitter 212 in known fashion, and which may be programmed or altered to perform the functions described herein. The CDPD transmitter 212 outputs signals that are to be transmitted through the front end gain amplifier 203 and antenna 201.

Operation of a First Embodiment of the Present Invention

Figure 3:
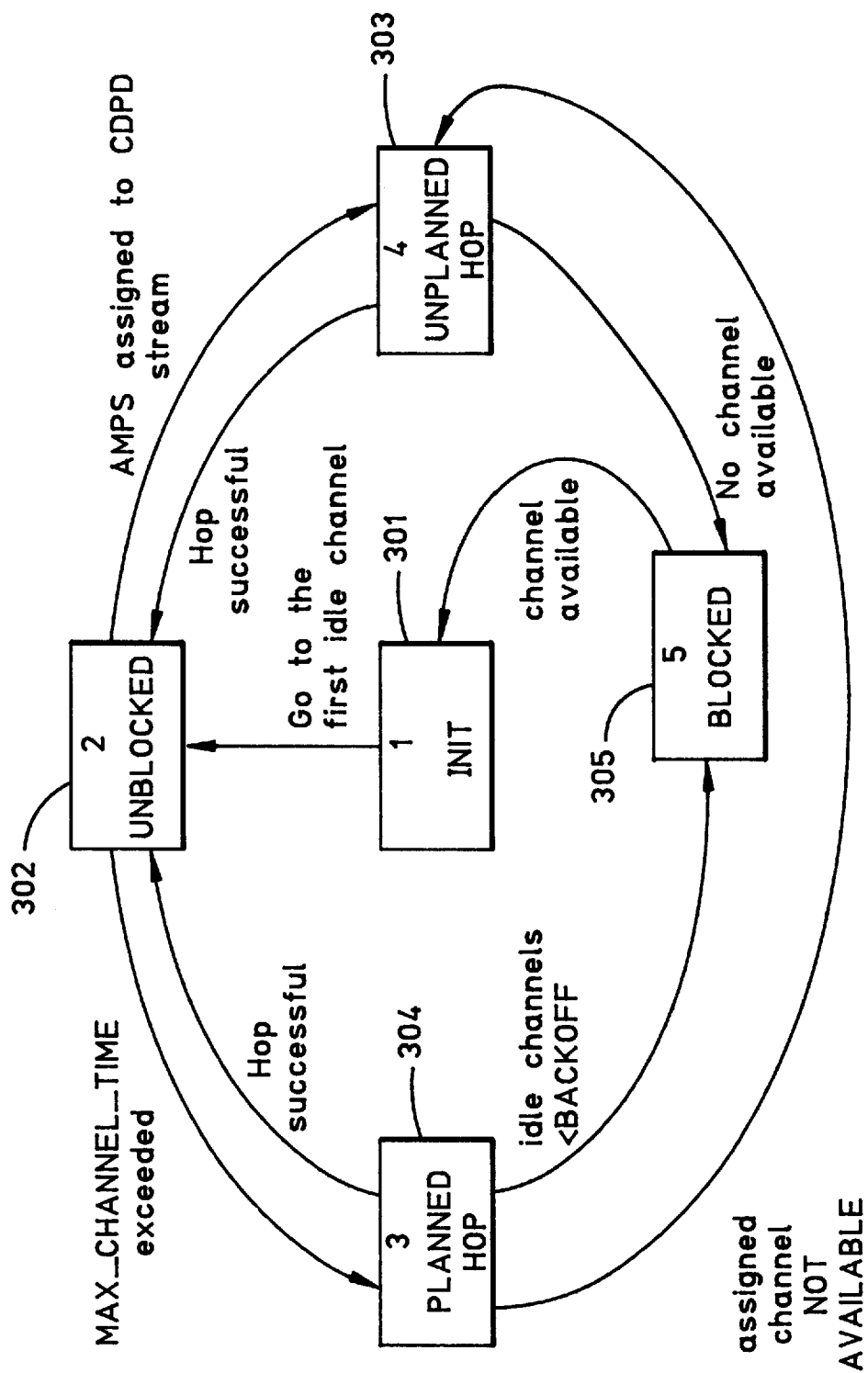
FIG. 3 is a state diagram which illustrates the operation of a processor in accordance with the present invention.

FIG. 3 is a state diagram which illustrates the operation of the processor 210 in accordance with the present invention. Each state 301–305 is illustrated in greater detail in FIGS. 4–8. FIGS. 4–8 are flow charts which illustrate the activities performed by the processor 210 in each state. FIGS. 4–8 are presented in sequential format only for clarity and ease of understanding. It should be understood that the processor of the present invention may be implemented by a multi-tasking processor, multiple processors, state machines, or other devices which are capable of performing the steps illustrated in FIGS. 4–8 concurrently or in sequences other than those illustrated.

Figure 4:
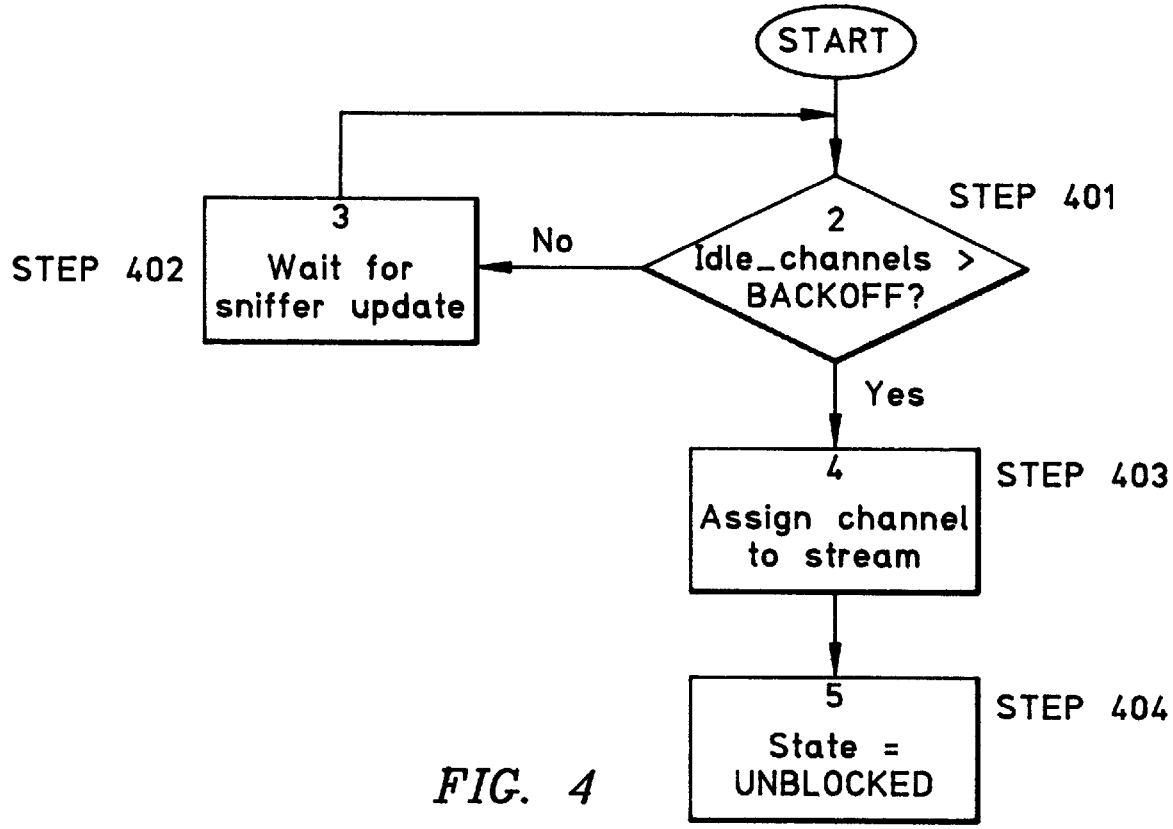
FIG. 4 is a flow chart which illustrates the activities performed by the processor in the initialization state illustrated in the state diagram of FIG. 3.

Referring to FIG. 4 and assuming that the processor 210 is in initialization state 301 as shown in FIG. 3, the processor 210 determines whether the number of idle channels (as determined by the length of the Idle_Channel list 1002 and the CDPD_Streams list 1005 ) is greater than the value established by the Backoff parameter 1032 (STEP 401). If there are less idle channels than required by the Backoff parameter 1032, then the processor 210 does not select a channel and waits for an update from the sniffer circuit 209 (STEP 402). The processor 210 then repeats STEP 401. In the present invention, the sniffer circuit 209 dynamically determines which channels are occupied and reports this information to the processor 210. If there are more idle channels than required by the Backoff parameter 1032, then the first idle channel from the Idle_Channel list 1002 is assigned by the processor 210 to transmit a data stream from the base station to an end system, such as a mobile end system within a CDPD network using the second communications network (STEP 403). Next, the present invention enters unblocked state 302 as shown in FIG. 3 (STEP 404).

Figure 5:
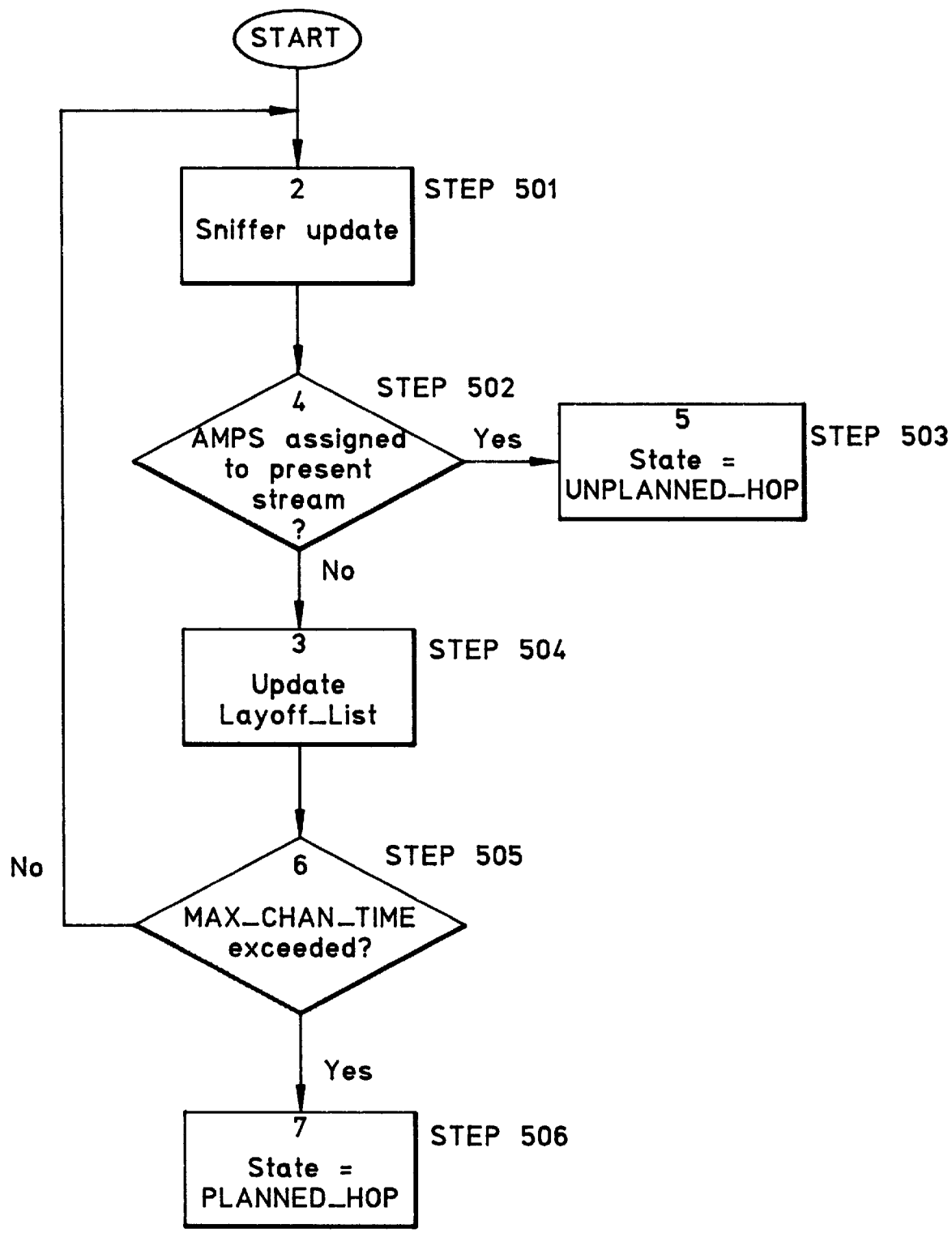
FIG. 5 are flow charts which illustrate the activities performed by the processor in the unblocked state illustrated in the state diagram of FIG. 3.

Unblocked state 302 is illustrated in detail in FIG. 5. In unblocked state 302, the processor 210 receives updates from the sniffer circuit 209 (STEP 501) and determines whether the first communications network is attempting to occupy any of the channels that are currently occupied by the second communications network (STEP 502). That is, the sniffer determines whether the first communications network is outputting radio frequency energy at the frequency associated with a channel that is occupied by the second communications network. If the first communications network is attempting to occupy a channel that is occupied by the second communications network, then the processor 210 enters unplanned hop state 303 (STEP 503) (described in detail below). If the first communications network is not attempting to occupy a channel, then the processor 210 updates the Chan_Layoff list 1004 by resetting any AMPS_Layoff flags 1014 or CDPD_Layoff flags 1024 which are associated with channels that have been idle for periods greater than the values established by the AMPS_Layoff_Time parameter 1033 or the Max_Layoff_Time parameter 1031, respectively (STEP 504). The processor 210 also monitors the amount of time each channel has been occupied by the second communications network to determine whether the period established by the Max_Channel_Time 1030 has been exceeded on any channel (STEP 505). If the maximum period established by Max_Layoff_Time 1030 has expired for any of the channels, then the processor 210 enters planned hop state 304 as shown in FIG. 3 (STEP 506).

Figure 6:
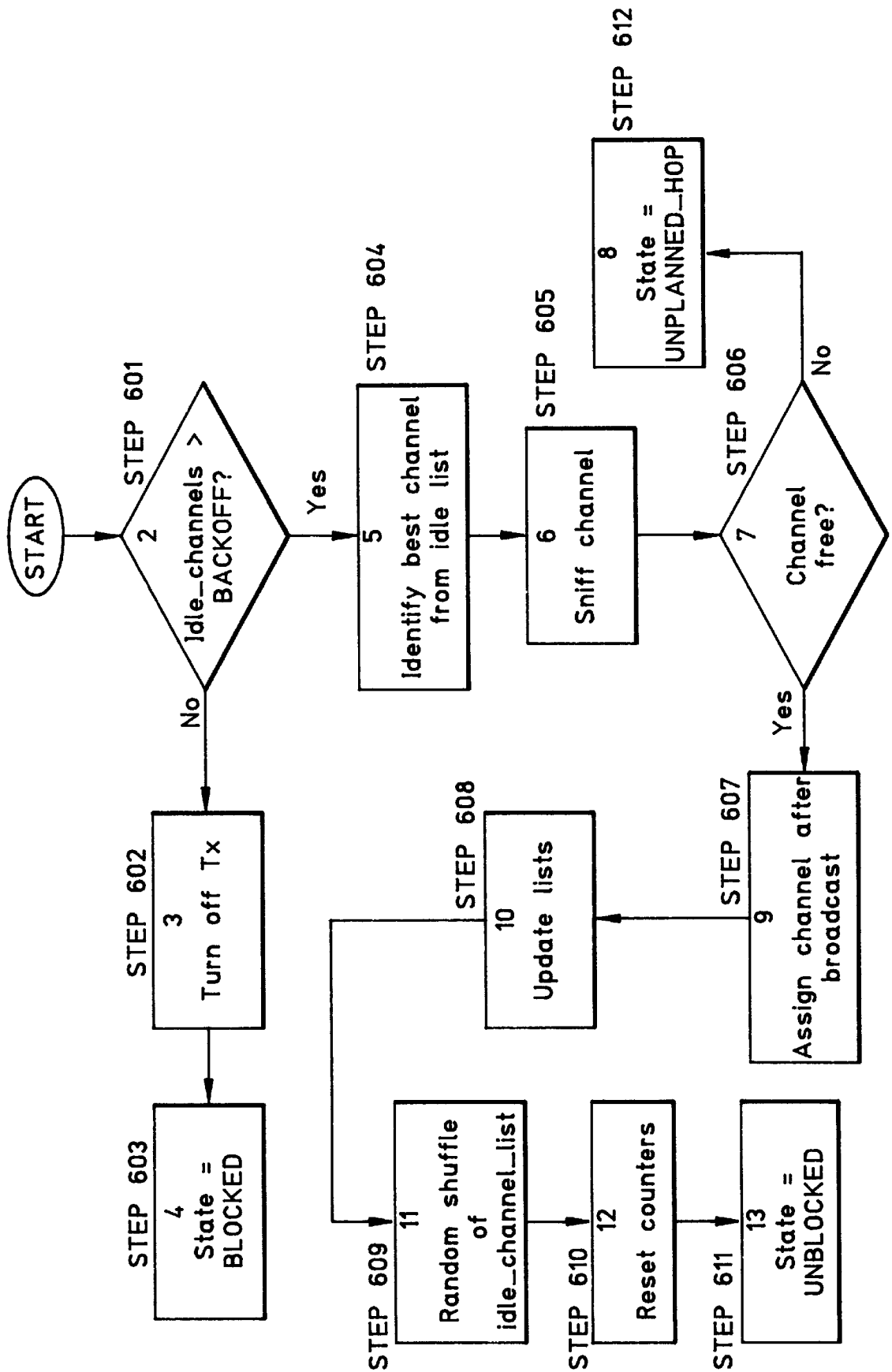
FIG. 6 are flow charts which illustrate the activities performed by the processor in the planned hop state illustrated in the state diagram of FIG. 3.

Planned hop state 304 is illustrated in FIG. 6. Upon entering planned hop state 304, the processor 210 determines whether the number of idle channels within the Idle_Channel list 1002 is greater than the value established by the Backoff parameter 1032 (STEP 601). If the number of idle channels is not greater than the value set by the Backoff parameter 1032, then the CDPD transmitter 212 discontinues transmitting data on a channel (STEP 602). The processor 210 then enters blocked state 305 (STEP 603) (described in detail below). Alternatively, if there are sufficient idle channels available to assign a channel without violating the Backoff parameter 1032, then the processor 210 identifies and selects a channel to be used (STEP 604). The selection is made based upon the following priority: (1) non-extended channels from the Likely_Hop list 1003; (2) extended channels from the Likely_Hop list 1003; (3) non-extended channels on the Idle_Channel list 1002; (4) extended channels from the Idle_Channel list 1002; (5) non-extended channels on the Chan_Layoff list 1004 (only if the LUI 1006 is set); and (6) extended channels on the Chan_Layoff list 1004 (only if the LUI 1006 is set).

The processor 210 receives information from the sniffer circuit 209 (STEP 605) to determine whether the selected channel is idle (i.e., is not occupied by the first communications network) (STEP 606). If idle, then a channel hop to the selected channel is performed (STEP 607). The processor 210 updates the each of the five lists (STEP 608) and randomly shuffles the Idle_Channel list 1002 (STEP 609).

In one embodiment of the present invention, the channels that are included in the Idle_Channel list 1002 are shuffled by using a random number generator, such as a linear congruential random number generator, to generate a number between 0 and N-1, where N is the number of idle channels. For example, a random number y between 0 and N-1 may be generated using the following formulas:

$$y = INT[(x_n \cdot N)/m]$$

$$x_n = (a \cdot x_{n-1} + c) \bmod m$$

$$a = 9301$$

$$c = 49297$$

$$m = 233280$$

A simple algorithm for randomly shuffling the channels of the Idle_Channel list 1002 can then be implemented by:

(1) Starting with K=N, where K is a variable and N is the number of idle channels;
(2) generating a random number y between 0 and N-1;
(3) Swapping Idle_Channel[y] and Idle_Channel[K];
(4) Decrementing K;
(5) repeating (2) through (4) until K=0.

Idle_Channel[i] denotes the i'th entry into the Idle_Channel list 1002. In an alternate implementation the Idle_Channel list is not shuffled, instead the determination of the second communication channel as well as the likely hop list is performed by random selection. Thus selection may be performed by successively generating random numbers that will index the elements of the Idle_Channel list.

In order to determine if a channel has been used for the Max_Channel_Time 1030, a maximum channel timer (i.e., a resetable count down timer or count up timer, referred to as a dwell timer) is preferably used. Each channel's channel usage time is separately accounted for to determine if any channel has reached the Max_Channel_Time 1030. Accordingly, in the preferred embodiment of the present invention, each newly assigned channel required that a dwell timer be reset and begin timing the duration of the channel use (STEP 610) of a newly assigned channel. The processor 210 then reenters unblock state 302 (STEP 611).

Figure 7:
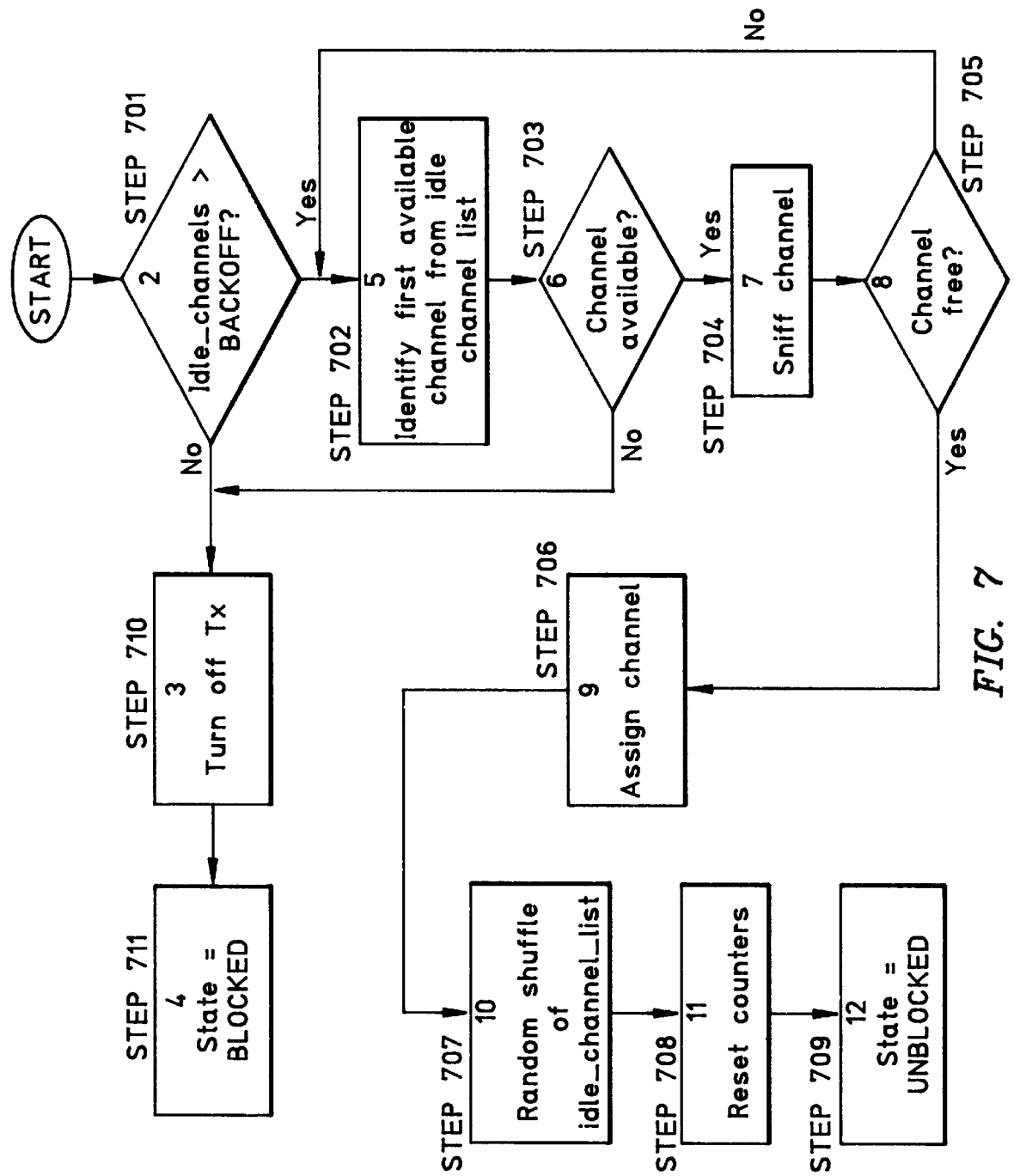
FIG. 7 are flow charts which illustrate the activities performed by the processor in the unplanned hop state illustrated in the state diagram of FIG. 3.

Returning to STEP 606, if the channel that was selected in STEP 604 is not idle, then the processor 210 enters the unplanned hop state 303 as shown in FIG. 3 (STEP 612). Unplanned hop state 303 is illustrated in FIG. 7. In unplanned hop state 303, the processor 210 determines whether the number of idle channels is greater than the value established by the Backoff parameter (STEP 701). If so, a channel is selected (STEP 702). The selection is made based upon the following priority: (1) non-extended channels from the Likely_Hop list 1003; (2) extended channels from the Likely_Hop list 1003; (3) non-extended channels on the Idle_Channel list 1002; (4) extended channels from the Idle_Channel list 1002; (5) non-extended channels on the Chan_Layoff list 1004 (only if the LUI 1006 is set); and (6) extended channels on the Chan_Layoff list 1004 (only if the LUI 1006 is set).

The processor 210 then determines whether the selected channel is available (e.g., ensures that the CDPD_Layoff flag 1024 and AMPS_Layoff flag 1014 are not set if the LUI 1006 is not set) (STEP 703). If the channel is available, then the processor 210 receives information from the sniffer circuit 209 which detects whether there is radio frequency energy generated by the first communications network on the selected channel (STEP 704). If there is no radio frequency power on the selected channel (i.e., the channel is idle) (STEP 705), then the selected channel is assigned to carry the data stream that was formerly carried by a channel that is now occupied by the first communications network (i.e., a successful unplanned hop is complete) (STEP 706). The processor 210 randomly shuffles the Idle_Channel list 1002 (STEP 707) and the dwell timer is reset and begins timing the duration of the channel's use (STEP 708). The processor 210 then reenters unblock state 302 (STEP 709).

If the number of idle channels within the Idle_Channel list 1002 is not greater than the value established by the Backoff parameter 1032 (STEP 701), or if there is no channel available in STEP 703, then the processor 210 turns off the CDPD transmitter 212 (STEP 710) and enters blocked state 305 as shown in FIG. 3 (STEP 711).

Figure 8:
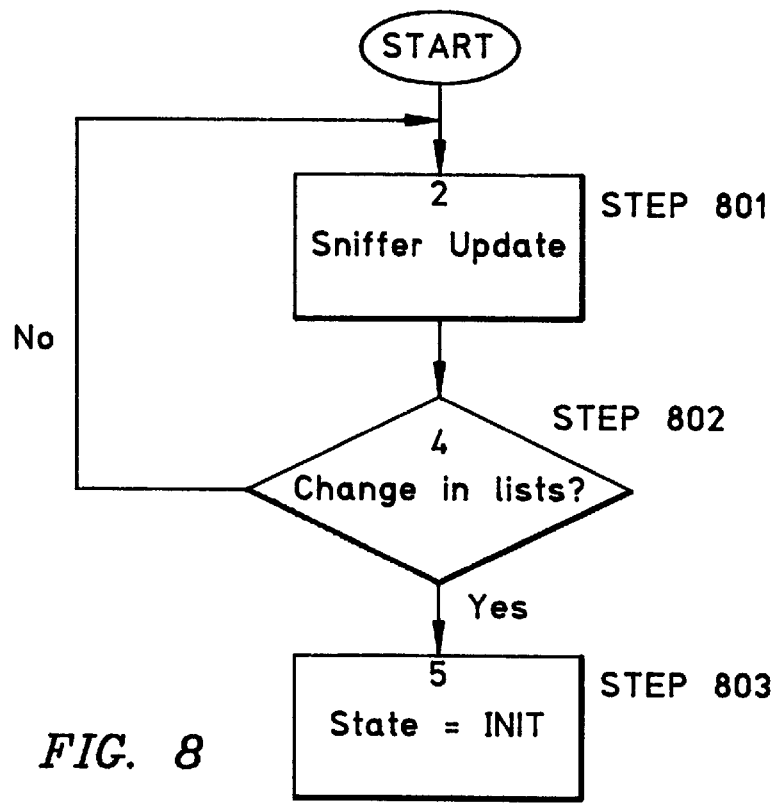
FIG. 8 are flow charts which illustrate the activities performed by the processor in the blocked state illustrated in the state diagram of FIG. 3.

Blocked state 305 is illustrated in FIG. 8. In blocked state 305, the processor 210 receives updated information from the sniffer circuit 209 regarding the status of each channel (STEP 801). If the status has changed such that a channel is made available (STEP 802), then the processor 210 enters initialization state 301 (STEP 803). If there is no change in the status of any channel, the processor 210 continues to update its lists with information from the sniffer circuit 209.

In situations in which the second communications network occupies more than one channel (which is typically the case), it is preferable to have multiple Likely_Hop lists 1003. Preferably, each Likely_Hop list 1003 is unique and associated with one occupied channel. Thus, when a hop is required by the second communications network, the channel to which the second communications network is most likely to hop is different for each occupied channel (i.e., "best hop channel"). FIG. 10C illustrates a plurality of Likely_Hop lists 1003A–1003J, each associated with a particular channel number 1052 on the CDPD_Streams list 1005. In FIG. 10C, each of the channels in Likely_Hop list 1003A–1003J are the same, but are ordered differently. Preferably, the a different channel is at the head (i.e., the first channel) in each Likely_Hop list 1003A–1003J. This is possible only if the quantity of channels in each Likely_Hop list is greater than or equal to the quantity of channels occupied by the second communications network. Preferably, the number of channels in the Idle_Channel list 1002 is greater than the sum of the Backoff parameter value and the number of occupied channels. In an alternative embodiment, each Likely_Hop list 1003A–1003J may include channels which are not present in other Likely_Hop lists 1003A–1003J. Preferably, the number of idle channels is greater than the sum of the number of occupied channels and the Backoff parameter, such that each channel occupied by the second communications network can be associated with a unique best hop channel which is not within a backoff zone.

In an alternative embodiment of the present invention, each Likely_Hop list 1003 has a length (i.e., includes a number of channels) that is equal to the sum of the Backoff parameter, the number of occupied channels, and a pad (i.e., preferably a value equal to 2 or 3). The Idle_Channel list 1002 is equal to, or greater than, the length of each Likely_Hop list 1003. The channel at the head of each Likely_Hop list 1003 is unique and not found within other Likely_Hop lists 1003. Other channels within a given Likely_Hop list 1003, excluding the channel at the head, may be common to other Likely_Hop lists 1003. Thus, each Likely_Hop list 1003 associated with each occupied channel has a unique idle channel at the head (i.e., as the best hop channel) of its list.

Another Embodiment of the Present Invention

Figure 9A:
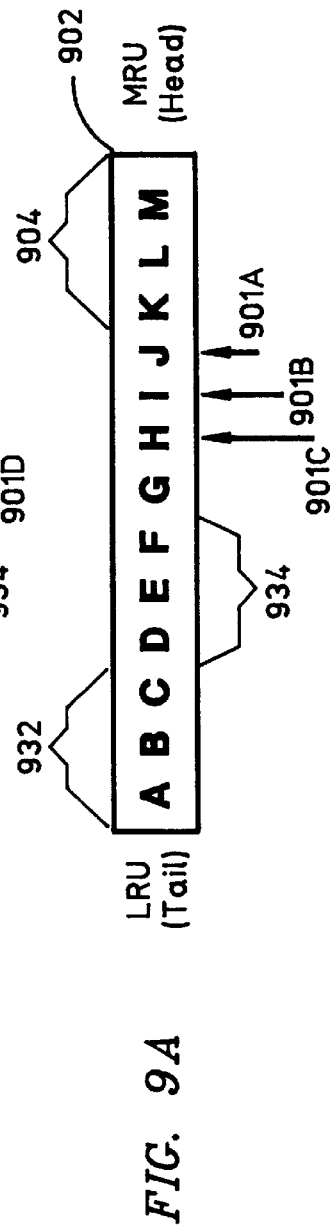
FIGS. 9A–9D illustrate the organization of an Idle_Channel list in accordance with the fourth embodiment of the present invention where a first communication network selects channels using a FIFO algorithm.

Another embodiment of the present invention is preferably used with a first communications network that selects channels for use by means of a first-in-first-out (FIFO) algorithm. In this alternative embodiment, an additional parameter referred to as the "Hop Threshold" 1034 is provided. Also, the nature of the Idle__Channel list 902 differs from that described above (see FIGS. 9A–D). In accordance with a FIFO algorithm, the channel which has not been used by the first communications network for the longest period of time (i.e., the least recently used (LRU) channel) is assigned the highest priority for use by the first communications network. An ordered Idle__Channel list 902 is assembled and maintained by the processor 210 of the present invention. The Idle__Channel list 902 indicates which channels are not being occupied by the first communications network. In contrast to the first embodiment of the present invention, channels on Idle__Channel list 902 may be occupied by the second communications network. Those channels occupied by the second communications network are preferably also listed in the CDPD__Streams list 1005. Thus channels idle for both the first and second communications network may be determined by the processor 210 comparing the Idle__Channel list 902 with the CDPD__Streams list 1005. In FIG. 9A, the Idle__Channel list 902 includes Channels "A" through "M". In accordance with one embodiment of the present invention, the channel at the tail (i.e., Channel "A") is the least recently used channel and the channel at the head (i.e., Channel "M") is the most recently used channel on the Idle__Channel list. The Idle__Channel list 902 is used by the processor 210 to determine which channel is to be assigned for use by the second communications network. Channels from the Idle__Channel list 902 that are currently in use by the second communications network are monitored by the processor 210. Channels currently in use by the second communications network are indicated by Channel Pointers 901A–901E indicating the relative position of a channel currently in use by the second communications network. In one embodiment, CDPD__Streams list 1005 is not required, since each of the channels in use by the second communications network are indicated by a Channel Pointer 901.

Figure 9B:
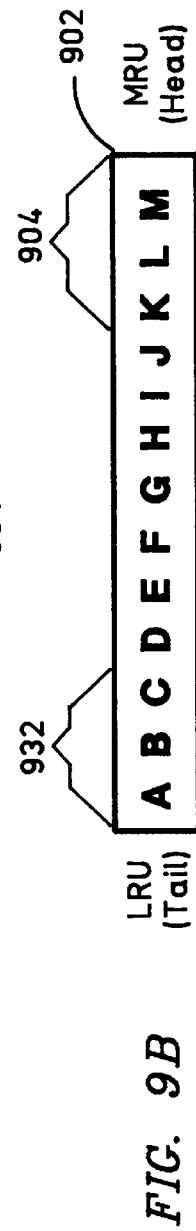
Figure 9C:
Figure 9D:
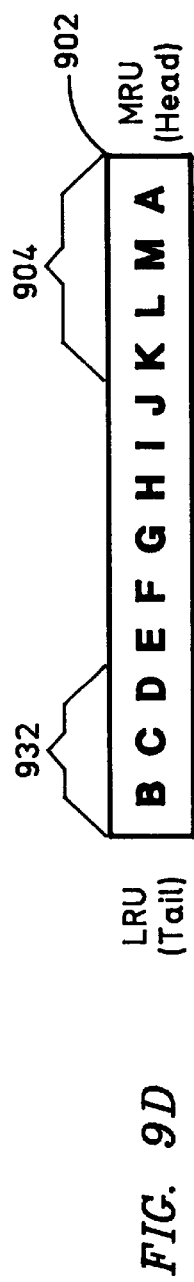

When a channel is released by the first communications network it is placed at the head (i.e., far right) of the Idle__Channel list 902. Accordingly, the channel at the head of the Idle__Channel list 902 is preferably the channel that was released by the first communications network most recently. In FIGS. 9A–9C Channel "M" is the channel that was released by the first communications network most recently. In FIG. 9D channel "A" is the channel that was released by the first communications network most recently. Each channel on the Idle__Channel list to the left of a given channel has remained unused by the first communications network for a greater period of time than a channel to the right. When a channel is released by the second communications network, the corresponding Channel Pointer 901 is dropped. However, the processor 210 continues to monitor the CDPD__Layoff flag 1024 of each recently released channels to determine when they may be used by the second communications network. FIG. 9A illustrates three channels being used by the second communications network and monitored by the processor 210, as indicated by the Channel Pointers 901A–C. In FIG. 9B, only one channel is being used by the second communications network as indicated by the single Channel Pointer 901D.

When a channel is released by the first communications network, that channel is added to both the Idle__Channel list 902 and the Chan__Layoff list 1004. Also, the AMPS__Layoff flag 1014 associated with the channel is set. In accordance with the present invention, each channel must remain idle for a predetermined time as determined by the AMPS__Layoff__Time parameter 1033 before the associated AMPS__Layoff flag 1014 is reset and the channel is removed from the Chan__Layoff list 1004. In the example illustrated in FIG. 9A, the channels "K", "L" and "M" within the Idle__Channel list 902 are form a "Layoff Zone" 904 which includes channels that have their AMPS__Layoff flag 1014 set. These channels have been released less than the amount of time required for the AMPS__Layoff flag 1014 to have been reset and the channel to be removed from the Chan__Layoff list. Channels having their AMPS__Layoff flag 1014 set are may not be used by the second communications network. Also, channels on the Chan__Layoff list 1004 may only be used is the LUI 1006 is reset. However, such available channels within the Chan__Layoff list 1004 are assigned a lower priority than other idle channels not on the Chan__Layoff list 1004. If the LUI 1006 is set, then only channels, having both the CDPD__Layoff flag set 1024 and the AMPS__Layoff flag 1014 reset, may be used by the second communications network.

When a channel is released by second communications network, the channel is added to the Chan__Layoff list 1004 and the associated CDPD__Layoff flag 1024 set. Preferably, the processor 210 monitors both the CDPD__Layoff flag 1024 and AMPS__Layoff flag 1014 for each channel. In this manner the processor 210 can select channels whose CDPD__Layoff flag is not set and avoid selecting channels having the AMPS__Layoff flag set.

A Backoff parameter 1032, as described above, is preferably provided. The Backoff parameter 1032 defines a "Backoff zone" 932 (i.e., determines the number of channels which preferably must remain idle at all times). For example, if the Backoff parameter 1032 is set to 3, then channels "A", "B", and "C" would be within the Backoff Zone 932 and thus not be available for use by the second communications network.

In accordance with one embodiment of the present invention, a "Hop__Threshold" parameter 1034 is defined which determines a "Threshold Zone" 934. The relative position of each channel within the Idle__Channel list 902 currently being used by the second communications network is monitored by processor 210 to detect entry into the Threshold Zone 934. The "Hop__Threshold" parameter 1034 determines how close a Channel Pointer 901 may come to the tail (least recently used channel) of the Idle__Channel list 902 before the processor 210 performs a planned channel hop from the effected channel to an available more recently used channel near the head of the Idle__Channel list 902 and below the "Layoff Zone". For example, in FIG. 9A, if a Hop__Threshold parameter 1034 is set to 3, the Threshold Zone 934 includes channels "D" through "F". If a Channel Pointer 901 points to any of channels "D" through "F" within the Threshold Zone 934 of the Idle__Channel list 902, then the processor 210 attempts to perform a channel hop to an available channel closer to the head of the Idle__Channel list 902 (i.e., a more recently used channel). If no channels are available, the processor 210 waits until a more recently used channel below the Layoff Zone 904 becomes available. Meanwhile, the effected channel remains in the Hop Threshold Zone 934. If the effected channel comes to fall within the Backoff Zone 932 and no channels outside the Layoff Zone 904 are yet available, then the processor 210 forces a hop to a channel within the channel Layoff Zone 904 if the layoff usage indicator indicates channels within the Layoff Zone 904 are available. Otherwise, the processor 210 discontinues using the effected channel and waits until a more recently used channel becomes available. The Backoff Zone 932 and Threshold Zone 934 provide a margin of safety between channel selection by the first communications network and channel selection by the second communications network.

Another Embodiment of the Present Invention

In contrast to the first embodiment described above and in accordance with another alternative embodiment, channels at the head of the Idle__Channel list 902 (most recently used channels) are not necessarily assigned the highest selection priority. Rather, when it is necessary for the second communications network to select a channel or perform a channel hop (e.g., when the maximum time has expired) the second communications network preferably selects the channel nearest the head and below the "Layoff Zone" 904. In FIG. 9A, the Channel Pointer 901A initially points to Channel "J", indicating that Channel "J" is being used by the second communications network. If an additional channel is selected for use by the second communications network, the processor 210 sets a Channel Pointer 901 to indicate the relative position of that channel as well. For example, in FIG. 9A, Channel Pointers 901B, 901C indicates that channel "I" and Channel "H" are also in use by the second communications network.

Each time a channel hop from one channel to another is performed by the second communications network, the processor 210 tries to select a more recently used channel for the hop. For example, in FIG. 9B, when the second communications network needs to perform a channel hop from channel "G" as pointed to by Channel Pointer 901 D, the processor 210 selects a channel closer to the head (i.e., a more recently used channel), such as channel "J" for the hop. The Channel Pointer 901D is incremented to point to channel "J". Referring to FIG. 9A, when the second communications network needs to perform a channel hop from channel "J" associated with Channel Pointer 901A, the processor 210 is unable to select a channel closer to the head, because all more channels closer to the head are within the Layoff Zone 904. Assuming the CDPD__Layoff flag 1024 associated with channel "G" is not set, the processor 210 selects channel "G" for the hop, because it is an available channel that is above the Backoff and Hop Threshold Zones 932, 934 and below the Layoff Zone 904. In a different case assume Channel "G" was unavailable and the LUI was set, then the processor 210 selects the channel within the Layoff Zone 904 with is closest to the tail (i.e., the least recently used), which does not have its CDPD__Layoff flag 1024 set (i.e., Channel "K", if its CDPD__Layoff flag 1024 associated with Channel "K" is not set).

A Likely_Hop list 1003 comprises a set of channels (preferably 2 or 3 channels) that are least likely to be assigned to the first communications network. As is the case for the first embodiment described above, the Likely_Hop list 1003 is broadcast to each second communications network end system to provide the second communications network end systems with advance information regarding the channels to which the base station 200 of the second communications network is likely to hop. The Likely_Hop list 1003 is ordered with reference to the Channel Pointers from the most recently used available channel to the least recently used available channel, excluding channels currently used by the second communications network and channels within the Layoff Zone 904, and Backoff Zone 932. Channels within the Threshold Zone 934 is preferably excluded from the Likely_Hop list 1003, unless there are few channels available. Also channels with their CDPD__Layoff flags 1024 set are preferably excluded from the Likely_Hop list 1003, but included only if no other channels are available. Referring to FIG. 9A, the Likely_Hop list 1003 may only contain channel "G". Referring to FIG. 9D, the Likely_Hop list 1003 preferably includes channels ordered from most recently used to least recently used channels and preferably includes channel "I" at the head of the Likely_Hop list 1003, followed by channel "H", followed by channel "G".

Additionally, channels can be removed by from the Idle__Channel list 902 by the first communications network. The first communications network, using a FIFO algorithm, takes channels from the tail of the Idle__Channel list (i.e., the least recently used channel). Thus channels selected by the first communications network are preferably within the Backoff Zone 932 as determined by the Backoff parameter 1032. Selection by the first communications network of a channel within Backoff Zone requires an adjustment to Backoff Zone 932 and Threshold Zone 934. Referring to FIG. 9B, if the first communications network selects the next channel in line, Channel "A", then processor 210 removes Channel "A" from the Idle channel list 902 and relocates the Backoff Zone 932 and Threshold Zone 934, as illustrated in FIG. 9C. Channels "B", "C", and "D" form the Backoff Zone 932 and channels "E", "F" and "G" form the Threshold Zone 934 as depicted in FIG. 9C.

This results in Channel Pointer 901D falling within the Threshold Zone 934. The processor 210 then attempts to execute a planned channel hop from Channel "G" to the most recently used available channel below the Layoff Zone 904 (i.e., Channel "J"). Upon performing the channel hop, the processor 210 starts monitoring the use of Channel "J" by the second communications network as illustrated by the Channel Pointer 901E. When Channel "A" is released by the first communications network it is placed at the head of the Idle__Channel list 902 and included in the Layoff Zone 904 as illustrated in FIG. 9D. P It should be understood that the order of the Idle__Channel list 902 is intended to anticipate the usage pattern of the first communications network. Therefore, the use and subsequent release of a channel by the second communications network does not alter the order of the Idle__Channel list 902 in referenced to the first communications network. Also by having the processor 210 select the most recently used available channel below the Layoff Zone 904, hops from one channel to another by the second communication system are minimized and the maximum amount of usable time is provided. For example, with reference to FIG. 9D, if the pointer 901E is pointing at channel "J" and the second communications network is required to perform a planned hop because the Max__Channel_Time 1030 has expired, the processor 210 would cause the second communications network to perform a planned channel hop to channel "I". The processor would then monitor the usage of channel "I" by the second communications network. Once the Max__Channel_Time 1030 again expires, the second communications network would perform another planned channel hop to Channel "H" if channel "H" is available.

After the planned hop from Channel "J", the CDPD__Layoff flag 1024 associated with channel "J" is set and remains set for a period of time determined by the value of the Max__Layoff_Time parameter 1031. Processor 210 monitors the CDPD__Layoff flag 1024 to determine when Channel "J" becomes available. Therefore Channel "J" will be unavailable until the Max__Layoff_Time 1031 expires unless, the LUI 1006 is set and there are no other channels not on the Chan__Layoff list 1004 outside the Backoff Zone 932. Channels having their AMPS__Layoff flag set but not their CDPD_Layoff flag set may be used by the second communications network as a lowest priority if the LUI is set.

The processor 210 follows a similar sequence of states and steps shown in FIGS. 3 through 8, except that the Idle_Channel list 902 is not randomly shuffled as in STEP 609 and STEP 707 of the previously described embodiment.

FIG. 11 illustrates an alternative embodiment of the present invention in which channels are assigned to groups based upon their assignment priority in the first communications network. For example, if the first communications network is an AMPS network, then the channels may be divided into a first group 1101 comprising a first subgroup of extended channels using extended frequencies and a second subgroup of non-extended channels using non-extended frequencies, and a second group 1102 comprising a first subgroup of extended channels using extended frequencies and a second subgroup of non-extended channels using non-extended frequencies. Extended and non-extended channels may be indicated by Priority Flags 1121 and 1131. Idle channels may be indicated by Idle flags 1122 and 1132. The first group 1101 may be assigned a higher priority then the second group 1102 for a period of time. After a time, the second group 1102 may be assigned a higher priority then the first group 1101 for a period of time. In order to determine which channels would be least likely used by the first communications network and most favorable for use by the second communications network, the relative priorities of each of the groups must be determined.

This is accomplished in accordance with the present invention, by each group of channels being assigned to a distinct Idle_Channel list. In FIG. 11, group one 1101 has a group one Idle_Channel list 1111 and group two 1102 has a group two Idle_Channel list 1112. A higher priority associated with a group causes the channels within the group to be used more often and result in fewer channels being placed on an Idle_Channel list. Conversely a lower priority associated with a group would cause those channels within the group to be used less often and result in more channels being placed on an Idle_Channel list. Thus, if the first communication places a higher priority on group one 1101 and a lower priority on group two 1102, the quantity of channels on the group one Idle_Channel list 1111 may be fewer than the quantity of channels on the group two Idle_Channel list 1112. Thus, monitoring the length of each Idle_Channel list provides information which allows a determination to be made as to whether a group has been assigned lower priority for the first communications network. The longer the length of an Idle_Channel list indicating the lower priority of the Idle_Channel list. In FIG. 11, group one Idle_Channel list 1111 is illustrated as being shorter than group two Idle_Channel list 1112, indicating that group one 1101 list of channels has a higher priority than group two 1102. If group one 1101 is determined to have been assigned lower priority for the first communications network, then group one 1101 may be assigned a higher priority with respect to the second communications network. On the other hand, if group one is determined to have been assigned a higher priority for the first communications network, then group one is preferably assigned a lower priority with respect to the second communications network. Thus, the group which is assigned to a lower priority in the first communications network will be assigned to a higher priority in the second communications network. In FIG. 11, group one 1101 appears to have a higher priority associated with the first communications network and may be assigned a lower priority with respect to the second communications network and group two 1102 appears to have a lower priority with respect to the first communications network and may be assigned a higher priority for the second communications network. As the Idle_Channel lists 1111, 1112 change in length, indicating a priority change for the first communications network, the priority of with respect to each group preferably changes for the second communications network as well.

In accordance with the present invention, an "Idle_List_Number 1035 parameter (see FIG. 10A) is provided which indicates the number of groups of channels being used by the first communications network, and thus the number of Idle_Channel lists to be used. In the example of FIG. 11, the Idle_List_Number 1035 parameter is equal to two. Accordingly, two Idle_Channel lists 1111, 1112 were generated. When more than one Idle_Channel list is being used, the processor 210 monitors the length (quantity of channels) of each Idle_Channel list. Preferably, when a first Idle_Channel list which is presently assigned the lowest priority grows much longer than a second Idle_Channel list which is presently assigned the highest priority, the processor 210 changes the priority assignment of the Idle_Channel lists. Preferably, a parameter "Persistence_Period" 1036 (see FIG. 10A) is preferably provided which establishes a time period, such that the length of the second Idle_Channel list must remain greater than the length of the first Idle_Channel list for at least the duration of the "Persistence_Period" 1036. Additionally, a parameter "Persistence_Length" 1037 (see FIG. 10A) is also preferably provided which establishes how much greater the quantity of channels on one Idle_Channel list must be over another in order for the processor 210 to change the priority assignment of the Idle_Channel lists.

Another Embodiment of the Present Invention

Another embodiment of the present invention is now presented. This alternative embodiment of the present invention is designed for use in a system in which the first communications network assigns channels using a sequential algorithm. This embodiment utilizes each of the lists and parameters described above with respect to the first embodiment. However, the nature of the Idle_Channel list differs from that described above with respect to the first embodiment. FIGS. 12A–C illustrate an example of the Idle_Channel list 1202 of this embodiment. Each channel is assigned a fixed relative position within the Idle_Channel list 1202 which does not depend upon the amount of time a channel has been idle. In FIGS. 12A–C the fixed relative position is indicated by a ranking number 1220 which is related to the sequential use of channels by the first communications network. Thus, the next channel that is selected for use by the first communications network is the highest ranking channel remaining on the Idle_Channel list 1202. For example, in FIG. 12A Channel "5" has the highest rank of zero such that it is the next channel to be selected by the first communications network. In FIG. 12B, Channel 7 has the highest rank of one and is the next channel for selection by the first communications network. Channels selected for use by the first communications network are removed from the Idle Channel list 1202. For example, assume Channel "5" was selected for use by the first communications network from the Idle_Channel list 1202 of FIG. 12A, then processor 210 removes Channel "5" from the list as illustrated by FIG. 12B and Channel "7" becomes the next channel for selection by the first communications network. Channels released by the first communications network are relocated in their predetermined ranking regardless of when they are released. For example, in FIGS. 12A–B, Channel "17" has a rank of 28. Channel "17" was recently released from the first communications network and the processor 210 places Channel "17" back in order of its ranking between Channel "19", which has a rank of 27 and Channel "25", which has a rank of 29. Channels recently released by the first communications network have their AMPS_Layoff flag 1214 set indicating that the amount of time the channel has been idle has not exceeded the AMPS_Layoff_Time 1033.

The processor 210 selects channels for use by the second communications network by initially choosing an available channel having the lowest ranking. Channels may be unavailable because they are currently used, the AMPS layoff flag 1214 indicates not to use the idle channel, or they fall within particular regions or zones of the Idle Channel list 1202. The processor 210 prefers to choose channels having lower rankings which are selected less often by the first communication system. While being used by the second communications network, the processor monitors the channel's relative position within the Idle_Channel list 1202. CDPD Channel Pointers 901A–B, similar to the CDPD Channel Pointers described above in the fourth embodiment are used to illustrate the monitoring by processor 210. Idle_Channel list 1202 preferably includes a Backoff Zone 932 established by the Backoff parameter 1032 and a Threshold Zone 934 established by the Hop_Threshold parameter 1034, as described above. In FIGS. 12A–C the Backoff parameter 1032 and the Hop_Threshold parameter 1034 are each set to two. In FIG. 12A the Backoff Zone 932 is illustrated as including Channel "5" and Channel "7" and the Threshold zone 934 includes Channel "12" and Channel "10". The processor 210 monitors the relative position of each channel within the Idle_Channel list 1202 used by the second communications network to determine if a Channel Pointer 901 falls within the Threshold Zone 934 or Backoff Zone 932. For example, in FIG. 12B Channel "5" had previously been selected by the first communications network and the processor 210 has removed Channel "5" from the Idle_Channel list 1202. The processor adjusts the Backoff Zone 932 and the Threshold Zone 934 as illustrated in FIG. 12B and determines that Channel Pointer 901A has fallen within the Threshold zone 934. The processor 210 attempts to perform a planned channel hop to the lowest ranked available channel. The processor selects Channel "i" (where i is the channel number) having a ranking of N (where N is the channel ranking) because Channel "i+1" is unavailable with its AMPS_Layoff flag 1214 set. The processor 210 monitors Channel "i" as illustrated by the Channel Pointer 901A in FIG. 12C. If the processor can not perform a planned channel hop, it will wait for an available channel so long as the Channel Pointer and channel remain in the Threshold Zone 934 and do not fall into the Backoff Zone 932. In the case where the Channel pointer 901 falls within the Backoff Zone 932, the processor 210 performs a channel hop to another available channel. If no channel is available, the processor 210 vacates the channel and discontinues communication using that channel.

A planned channel hop is preferably performed when the usage time of a channel by the second communications network has exceeded the Max_Channel_Time 1031. When a dwell timer, set to the Max_Channel_Time and counting the usage of each channel by the second communications, expires, the processor 210 attempts to perform a planned channel hop from the expired channel to a lower ranked available channel. Otherwise, a hop is attempted to a higher ranking available channel. For example, in FIG. 12C, assume Channel "i" has been in use for the maximum allowed time as indicated by reaching the Max_Channel_Time. Channel Pointer 901A indicates the monitoring by the processor 210. Because Channel "i+1" has its AMPS_Layoff flag 1214 set, the processor 210 can not select this lower ranked channel. Neither can Channel "21" be selected (i.e., the next higher ranked channel), because its AMPS Layoff flag 1214 is set. However, Channel "25" may be selected for a hop by the second communications network, because its AMPS_Layoff flag is not set. The processor 210 releases Channel "i", hops to Channel "25", and monitors the usage of Channel "25" by the second communications network.

Other than the fact that channels are ordered with respect to a fixed relative positioning instead of with regard to the time of a channels release, functions of this embodiment are similar to those of the embodiments described above. Also, the processor 210 of this embodiment preferably follows the sequence of states and steps shown in FIGS. 3 through 8, except that the Idle_Channel list is structurally and functionally different.

A number of embodiments of the present invention have been described. Nevertheless, it will be understood that various modifications may be made without departing from the spirit and scope of the invention. For example, while the above description indicates that either a pointer or the relative location of a channel is used to indicate which channel is to be selected as the next channel to be used by the second communications network, any other means may be used. For example, a flag associated with the channel is preferably set, a channel identification code may be placed in a register, the relative location of the channel may be placed in a register, etc. FIG. 10B illustrates the storage means for the embodiment as illustrated in FIG. 10A and may also illustrate the storage means for the other embodiments with slight modification.

Also, while the present invention has been described as using lists having a head and tail, it should be obvious to one skilled in the art that the lists can be thought of as groups or sets wherein the channels are members within the group or set and can be numerically ordered or organized in some manner.

Furthermore, any method may be used to randomly shuffle the order of the channels of the Idle_Channel list in accordance with the first embodiment of the present invention. Still further, any method may be used to detect that the first communications network has begun, or is about to begin, transmitting on a channel. For example, a direct communications link between the first and second communications network may be used to inform the processor 210 that the first communications network is to cease a channel, an independent antenna dedicated to receiving transmissions from the first communications network may be used to receive radio frequency energy transmitted by the first communications network and an independent sniffer circuit may analyze such received signals.

Still further, it should be noted that the present invention is applicable to any first and second communications network in which the first communications network has priority over the second, such that the second communications network must vacate a channel or frequency when the first communications network begins broadcasting on that channel or frequency. The use of the AMPS network and the CDPD network is only exemplary of the first and second communications networks.

Accordingly, it is to be understood that the invention is not to be limited by the specific illustrated embodiment, but only by the scope of the appended claims.

We claim:

1. In a communication system having a first and a second communications network sharing a plurality of communication channels, the second communications network overlaying the first communications network, a method for selecting a channel among potentially available channels of the plurality of communication channels to be used for communicating information between an end system and a base station, the method comprising the steps of:
   (a) generating an ordered idle channel list of idle channels of the plurality of communication channels, the ordered idle channel list having a head and a tail; and
   (b) selecting a channel from the ordered idle channel list for use by the second communications network to communicate information between the end system and the base station; and further comprising the steps of:
   (c) generating a channel layoff list of channels of the plurality of channels released by the first communications network within a first predetermined period of time; and
   (d) removing channels from the channel layoff list when the channels have been released by the first communications network for a time interval greater than said first predetermined of time,
   wherein in step (b), a channel is not selected from the ordered idle channel list when the channel is on the channel layoff list.

2. In a communication system having a first and a second communications network sharing a plurality of communication channels, the second communications network overlaying the first communications network, a method for selecting a channel among potentially available channels of the plurality of communication channels to be used for communicating information between an end system and a base station, the method comprising the steps of:
   (a) generating an ordered idle channel list of idle channels of the plurality of communication channels, the ordered idle channel list having a head and a tail; and
   (b) selecting a channel from the ordered idle channel list for use by the second communications network to communicate information between the end system and the base station; and further comprising the steps of:
   (c) generating a channel layoff list of channels of the plurality of channels released by the first communications network within a first predetermined period of time;
   (d) removing channels from the channel layoff list when the channels have been released by the first communications network for a time interval greater than said first predetermined of time; and
   (e) providing a layoff usage indicator having a first and second state,
   wherein in step (b) a channel is not selected from the ordered idle channel list when the channel is on the channel layoff list and the layoff usage indicator is in the first state.

3. The method of claim 2, wherein the channel layoff list is a subset of the ordered idle channel list and the channel layoff list includes a flag for each channel on the list, the flag indicating whether the channel has been released for a time greater than the first predetermined interval of time.

4. In a communication system having a first and a second communications network sharing a plurality of communication channels, the second communications network overlaying the first communications network, a method for selecting a channel among potentially available channels of the plurality of communication channels to be used for communicating information between an end system and a base station, the method comprising the steps of:
   (a) a generating an ordered idle channel list of idle channels of the plurality of communication channels, the ordered idle channel list having a head and a tail; and
   (b) selecting a channel from the ordered idle channel list for use by the second communications network to communicate information between the end system and the base station; and further including the steps of:
   (c) generating a channel layoff list of channels of the plurality of channels released by the second communications network within a second predetermined period of time;
   (d) removing channels from the channel layoff list when the channels have been released by the second communications network for a time interval greater than said second predetermined of time; and
   (e) providing a layoff usage indicator having a first and second state,
   wherein in step (b) a channel is not selected from the ordered idle channel list when the channel is on the channel layoff list and the layoff usage indicator is in the first state.

5. The method of claim 4, wherein the channel layoff list is a subset of the ordered idle channel list and the channel layoff list includes a flag for each channel on the list, the flag indicating whether the channel has been released for a time greater than the second predetermined interval of time.

6. In a communication system having a first and a second communications network sharing a plurality of communication channels, the second communication network overlaying the first communications network, a method for selecting a channel among potentially available channels of the plurality of communication channels to be used for communicating information between an end system and a base station, the method comprising steps of:
   (a) generating an ordered idle channel list of idle channels of the plurality of communication channels, the ordered idle channel list having a head and a tail; and
   (b) selecting a channel from the ordered idle channel list for use by the second communications network to communicate information between the end system and the base station;
   wherein a predetermined number of channels of the plurality of channels on the ordered list of idle channels are set aside for use by only the first communications network and in step (b), a channel is not selected from the predetermined number of channels; and
   further comprising the step of forcing the second communications network to release a channel when the number of channels on the ordered idle channel list is less than the predetermined number of channels set aside for the first communications network.

7. In a communication system having a first and a second communications network sharing a plurality of communication channels the second communications network overlaying the first communications network, an apparatus for selecting a channel among potentially available channels of the plurality of communication channels to be used for communicating information between an end system and a base station the apparatus comprising:
   means for generating an ordered idle channel list of idle channels of the plurality of communication channels, the ordered idle channel list having a head and a tail; and means for selecting a channel from the ordered idle channel list for use by the second communications network to communicate information between the end system and the base station; the system further comprising:

means for generating a channel layoff list of channels of the plurality of channels released by the first communications network within a first predetermined period of time; and means for removing channels from the channel layoff list when the channels have been released by the first communications network for a time interval greater than said first predetermined of time, wherein means for selecting does not select a channel from the ordered idle channel list when the channel is on the channel layoff list.

8. In a communication system having a first and a second communications network sharing a plurality of communication channels the second communications network overlaying the first communications network, an apparatus for selecting a channel among potentially available channels of the plurality of communication channels to be used for communicating information between an end system and a base station, the apparatus comprising:

means for generating an ordered idle channel list of idle channels of the plurality of communication channels, the ordered idle channel list having a head and a tail; and means for selecting a channel from the ordered idle channel list for use by the second communications network to communicate information between the end system and the base station; the system further comprising:

means for generating a channel layoff list of channels of the plurality of channels released by the first communications network within a first predetermined period of time;

means for removing channels from the channel layoff list when the channels have been released by the first communications network for a time interval greater than said first predetermined of time; and means for providing a layoff usage indicator having a first and second state, wherein the means for selecting a channel does not select a channel from the ordered idle channel list when the channel is on the channel layoff list and the layoff usage indicator is in the first state.

9. The apparatus of claim 8, wherein the channel layoff list is a subset of the ordered idle channel list and the channel layoff list includes a flag for each channel on the list, the flag indicating whether the channel has been released for a time greater than the first predetermined interval of time.

10. In a communication system having a first and a second communications network sharing a plurality of communication channels the second communications network overlaying the first communications network, an apparatus for selecting a channel among potentially available channels of the plurality of communication channels to be used for communicating information between an end system and a base station, the apparatus comprising:

means for generating an ordered idle channel list of idle channels of the plurality of communication channels, the ordered idle channel list having a head and a tail; and means for selecting a channel from the ordered idle channel list for use by the second communications network to communicate information between the end system and the base station; the system further comprising:

means for generating a channel layoff list of channels of the plurality of channels released by the second communications network within a second predetermined period of time;

means for removing channels from the channel layoff list when the channels have been released by the second communications network for a time interval greater than said second predetermined of time; and means for providing a layoff usage indicator having a first and second state, wherein the means for selecting a channel does not select a channel from the ordered idle channel list when the channel is on the channel layoff list and the layoff usage indicator is in the first state.

11. The apparatus of claim 10, wherein the channel layoff list is a subset of the ordered idle channel list and the channel layoff list includes a flag for each channel on the list, the flag indicating whether the channel has been released for a time greater than the second predetermined interval of time.

12. In a communication system having a first and a second communications network sharing a plurality of communication channels the second communications network overlaying the first communications network, an apparatus for selecting a channel among potentially available channels of the plurality of communication channels to be used for communicating information between an end system and a base station, the apparatus comprising:

means for generating an ordered idle channel list of idle channels of the plurality of communication channels, the ordered idle channel list having a head and a tail; and means for selecting a channel from the ordered idle channel list for use by the second communications network to communicate information between the end system and the base station;

wherein a predetermined number of channels of the plurality of channels on the ordered list of idle channels are set aside for use by only the first communications network and the means for selecting a channel does not select a channel from the predetermined number of channels; and further including means for forcing the second communications network to release a channel when the number of channels on the ordered idle channel list is less than the predetermined number of channels set aside for the first communications network.

* * * * *

UNITED STATES PATENT AND TRADEMARK OFFICE
CERTIFICATE OF CORRECTION

PATENT NO. : 5,832,384 Page 1 of 1
APPLICATION NO. : 08/408644
DATED : November 3, 1998
INVENTOR(S) : Balachandran et al.

It is certified that error appears in the above-identified patent and that said Letters Patent is hereby corrected as shown below:

On the title page item (56): Under References Cited, delete the section entitled U.S. PATENT DOCUMENTS in its entirety, and replace with the following:
--5,040,238   08/1991   Comroe et al. .................................. 455/33.4
5,111,534   05/1992   Benner ................................................ 455/33.2
5,193,101   03/1993   McDonald et al. .................................. 455/33.4
5,247,701   09/1993   Comroe et al. ...................................... 455/33.4
5,361,401   11/1994   Pirillo .................................................... 455/53.1
5,377,222   12/1994   Sanderford, Jr. .................................... 375/1
5,384,827   01/1995   Orikasa ................................................ 379/61
5,396,539   03/1995   Slekys et al. ........................................ 379/59
5,418,839   05/1995   Knuth et al. ......................................... 379/61
5,448,619   09/1995   Evans et al. ......................................... 379/58
5,504,803   04/1996   Yamada et al. ..................................... 379/59
5,504,939   04/1996   Mayrand et al. .................................... 455/34.1
5,507,034   04/1996   Bodin et al. ......................................... 455/34.1

At paragraph (56): Please add OTHER PUBLICATIONS under References Cited as follows:
--Constatinou, "Mobile Communication-Channel Modelling", British Telecommunications Engineering, Volume 9, Aug. 1990
Tellabs Incorporated, "Switch-Sharing in Cellular Networks with TITAN 5300 Digital Cross-Connect Systems", Mar. 1990--

Signed and Sealed this

Twenty-ninth Day of August, 2006

JON W. DUDAS
*Director of the United States Patent and Trademark Office*